United States Patent [19]
Mikame et al.

[11] Patent Number: 5,797,361
[45] Date of Patent: Aug. 25, 1998

[54] VARIABLE VALVE TIMING MECHANISM FOR INTERNAL COMBUSTION ENGINE

[75] Inventors: Kazuhisa Mikame, Nagoya; Tatsuo Iida, Toyota, both of Japan

[73] Assignee: Toyota Jidosha Kabushiki Kaisha, Toyota, Japan

[21] Appl. No.: 831,211

[22] Filed: Apr. 2, 1997

[30] Foreign Application Priority Data

Apr. 3, 1996 [JP] Japan .................................. 8-081456

[51] Int. Cl.⁶ .................................................. F01L 1/344
[52] U.S. Cl. ............................ 123/90.17; 123/90.31; 74/568 R; 464/2
[58] Field of Search ............................ 123/90.15, 90.17, 123/90.31; 74/567, 568 R; 464/1, 2, 160

[56] References Cited

U.S. PATENT DOCUMENTS

| | | | |
|---|---|---|---|
| 5,107,804 | 4/1992 | Becker et al. | 123/90.17 |
| 5,450,825 | 9/1995 | Geyer et al. | 123/90.17 |
| 5,520,145 | 5/1996 | Nagai et al. | 123/90.17 |

FOREIGN PATENT DOCUMENTS

| | | | |
|---|---|---|---|
| 3937644 | 5/1991 | Germany | 123/90.17 |
| 1-92504 | 4/1989 | Japan | 123/90.17 |

*Primary Examiner*—Weilun Lo
*Attorney, Agent, or Firm*—Kenyon & Kenyon

[57] ABSTRACT

A variable valve timing mechanism of an internal combustion engine varies the rotational phase of a driven shaft with respect to a drive shaft to vary the timing of the valve. The mechanism includes a first rotary member for a rotation in synchronism with the drive shaft and a second rotary member for a rotation in synchronism with the driven shaft. The second rotary member has a vane. The movement of the vane rotates the second rotary member with respect to the first rotary member to change the rotational phase of the driven shaft with respect to the drive shaft. Hydraulic pressure is supplied to one of the first hydraulic chamber and the second hydraulic chamber to move the vane. A lock member locks the second rotary member to the first rotary member to fix the rotational phase of the driven shaft with respect to the drive shaft. The lock member is held in a locked position when the engine is not running. The lock member is moved to an unlocked position by the hydraulic pressure when the engine reaches a predetermined running condition. The hydraulic pressure maintains the lock member in the unlocked position.

31 Claims, 14 Drawing Sheets

1

VARIABLE VALVE TIMING MECHANISM FOR INTERNAL COMBUSTION ENGINE

BACKGROUND OF THE INVENTION

1. Field of the Invention

The present invention relates to a variable valve timing control mechanism for internal combustion engines that controls either the intake valve timing or the exhaust valve timing of the engine in accordance with the running condition of the engine.

2. Description of the Related Art

Variable valve timing mechanisms control the valve timing of an engine valve in accordance with the running condition of the engine. One type of such variable valve timing mechanisms continuously varies the rotation phase (displacement angle) of a camshaft with respect to a crankshaft.

Japanese Unexamined Patent Publication No. 1-92504 discloses a variable valve timing mechanism of a continuously variable phase type that allows relative rotation between a timing pulley and an inner rotor for varying the valve timing. This variable valve timing mechanism will now be described with reference to FIG. 17.

A variable valve timing mechanism 90 includes a timing pulley 91 and an inner rotor 92. The timing pulley 91 has a plurality of projections 911 that project from the inner surface of the pulley 91 toward the center of the pulley 91. Oil chambers 912 are defined by each pair of adjacent projections 911. A plurality of vanes 921 project from the inner rotor 92. Each vane 921 is accommodated in one of the chambers 912. The vanes 921 and the walls of the chambers 912 define pressure chambers 93, one of which is on each side of each vane 921. The timing pulley 91 is connected to a crankshaft by a timing belt. The inner rotor 92 is secured to a camshaft 94. A plurality of passages 96 are defined in the camshaft 94, and a plurality of passages 97 are defined in the inner in the inner rotor 92.

Oil is supplied to the pressure chambers 93 via the passages 96 in the camshaft 94 and the passages 97 in the inner rotor 92. The inner rotor 92 and the camshaft 94 are integrally rotated with respect to the timing pulley 91 by the fluid pressure in the pressure chambers 93 acting on the vanes 921.

A pair of holes 913 are formed radially in a pair of opposing projections 911, respectively. A lock pin 95 and a spring 951 are accommodated in each hole 913. Each lock pin 95 is urged toward the center of the timing pulley 91 by the associated spring 951. Engaging holes 922 are defined in a pair of the passages 97 in the inner rotor 92. Each hole 922 corresponds to one of the lock pins 95. Each lock pin 95 is engageable with its corresponding hole 922. Specifically, one of the pins 95 is engaged with its corresponding hole 922 when the vanes 921 are at one of the maximum displacement positions at which the vanes 921 contact one of the walls of the chambers 912. When oil is supplied to the passages 97 and the force of the oil in the passages 97 is greater than the force of the springs 951, the lock pin 95 that is engaged with one of the holes 922 is retracted and disengaged.

When the engine is first started, the oil in the passages 96, 97 is not pressurized. Therefore, one of the lock pins 95 is engaged with the associated engaging hole 92 by the force of the associated spring 951. This allows the vanes 921 to remain at one of the maximum displacement positions, which restricts the relative rotation between the timing pulley 91 and the inner rotor 92.

When the oil pressure in the passages 96, 97 is increased by operation of the engine, the oil pressure acting on the lock pins 95 increases, accordingly. As a result, the pin 95 that is engaged with the associated hole 922 is pushed by the oil pressure against the force of the associated spring 951 and is therefore disengaged the pin 95 from the hole 922. If the pressures in the pressure chambers 93 on opposite sides of each vane 921 are different, the vanes 93 move toward the pressure chamber 93 that has the lower pressure. Accordingly, the timing pulley 91 is rotated with respect to the inner rotor 92.

In the variable valve timing mechanism 90, the timing pulley 91 synchronously rotates with the crankshaft. Therefore, relative rotation between the timing pulley 91 and the inner rotor 92 changes the rotation phase of the camshaft 94 with respect to the referential rotation phase of the engine, or the rotation phase of the crankshaft. Accordingly, the valve timing is advanced or retarded with respect to the crank angle.

When a lock pin 95 is disengaged from the associated engaging hole 922 and the timing pulley 91 rotates with respect to the inner rotor 92, the pin 95 is misaligned with the associated hole 922. Thus, the oil pressure in the passages 97 does not act on the lock pin 95. As a result, the lock pin 95 slides on the circumference of the inner rotor 92 while being pressed against to the rotor's circumference by the force of the spring 951. This wears the rotor's circumference, thereby increasing the amount of oil leakage between the projections 911 and the inner rotor 92 beyond an acceptable level. The oil leakage lowers the oil pressure in the pressure chambers 93 and thus deteriorates the responsiveness of the mechanism when varying the valve timing. Especially in variable valve timing mechanisms of a continuously variable phase type, it is hard to maintain the rotation phase of the timing pulley 91 with respect to the inner rotor 92 at a position between the two limit positions.

Further, sliding of the lock pins 95 on the inner rotor 92 and wearing of the rotor 92 caused by the sliding hinders smooth relative rotation between the timing pulley 91 and the inner rotor 92.

The vanes 921 projecting from the inner rotor 92, which are secured to the camshaft 94 are directly affected by torque fluctuation of the camshaft 94. That is, torque fluctuation of the camshaft 94 causes the vanes 921 to oscillate. This causes the oil pressure in each pressure chamber 93 to oscillate. Therefore, maintaining the pressure acting on the lock pins 95 at a certain level is difficult.

SUMMARY OF THE INVENTION

Accordingly, it is an objective of the present invention to provide a variable valve timing mechanism for an internal combustion engine that positively maintains a locking means, which prevents relative rotation between a first rotor and a second rotor, at a releasing position during relative rotation between the rotors.

Another objective of the present invention is to provide a variable valve timing mechanism for an internal combustion engine that is provided with simplified locking means.

To achieve the above objective, the present invention discloses a variable valve timing mechanism for an internal combustion engine. The engine has a drive shaft, a driven shaft driven by the drive shaft, and at least one valve driven by the driven shaft. The mechanism varies the rotational phase of the driven shaft with respect to the drive shaft to vary the timing of the valve. The mechanism includes a first rotary member for a rotation in synchronism with the drive shaft and a second rotary member for a rotation in synchronism with the driven shaft. The position of the second rotary member with respect to the first rotary member varies to change the rotational phase of the driven shaft with respect to the drive shaft. An actuating member is movable in a first direction and a second direction opposite to the first direction. The actuating member moves in the first direction to advance the valve timing and moves in the second direction to retard the valve timing. The movement of the actuation member rotates the second rotary member with respect to the first rotary member to change the rotational phase of the driven shaft with respect to the drive shaft. The actuating member has a first side and a second side opposite to the first side. A first hydraulic chamber is located on the first side of the actuating member. A second hydraulic chamber is located on the second side of the actuating member. Supplying means supplies hydraulic pressure to one of the first hydraulic chamber and the second hydraulic chamber to move the actuating member in one of the first direction and the second direction. The supplying means is selectively activated and deactivated based on an operation state of the engine. A lock member locks the second rotary member to the first rotary member in a predetermined position to fix the rotational phase of the driven shaft with respect to the drive shaft. The lock member is movable between a first position and a second position. The lock member immovably holds the actuating member with respect to the hydraulic chambers to lock the second rotary member with respect to the first rotary member in the first position. The lock member releases the actuating member to unlock the second rotary member with respect to the first rotary member in the second position. The lock member is held in the first position when the engine is out of operation. The lock member is moved to the second position based on the hydraulic pressure supplied by the supplying means upon the operation of the engine. The hydraulic pressure maintains the lock member in the second position.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

Variable valve timing mechanisms (VVT) according to several embodiments of the present invention will now be described with reference to the drawings. The term "front" is used herein to refer to the left side of FIG. 4, and the term "rear" refers to the right side of FIG. 4.

Firstly, VVT 10 according to a first embodiment will be described with reference to FIGS. 1 to 6.

Figure 1:
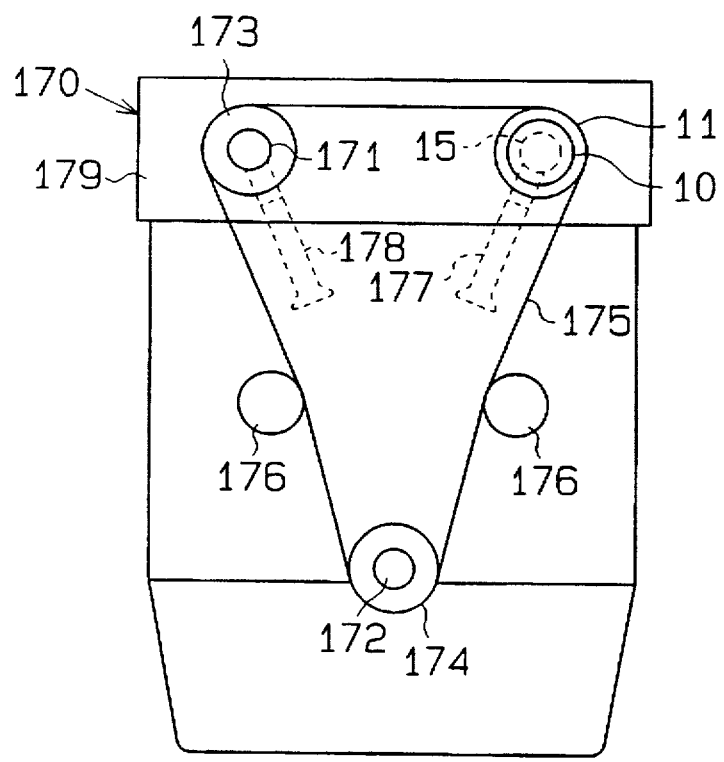
FIG. 1 is a schematic front view illustrating an internal combustion engine according to a first embodiment of the present invention.

As shown in FIG. 1, an internal combustion engine 70 includes an intake camshaft 15, an exhaust camshaft 171 and a crankshaft 172. Sprockets 11, 173 and 174 are secured to the ends of the shafts 15, 171 and 172, respectively. The sprockets 11, 173, 174 are connected by a timing chain 175. A pair of chain tensioners 176 apply tension to the chain 175. A VVT 10 is provided on the intake camshaft 15. Rotation of the crankshaft 172 is transmitted to the camshafts 15, 171 by the chain 175 and the sprockets 11, 173, 174. Accordingly, the camshafts 15, 171 synchronously rotate with the crankshaft 172, thereby actuating intake valves 177 and exhaust valves 178 at a predetermined valve timing.

As shown in FIGS. 2 to 6, the VVT 10 includes the sprocket 11, a rotor 12, a front cover 13, a rear plate 14, and the intake camshaft 15.

The intake camshaft 15 has a plurality of journals 151 (only one is shown). One of the journals 151 located at an end of the camshaft 15 has a pair of flanges 151a and 151b. The camshaft 15 is rotatably supported on a cylinder head 179 by cooperation of the flanges 151a, 151b and a bearing cap 180.

Figure 4:
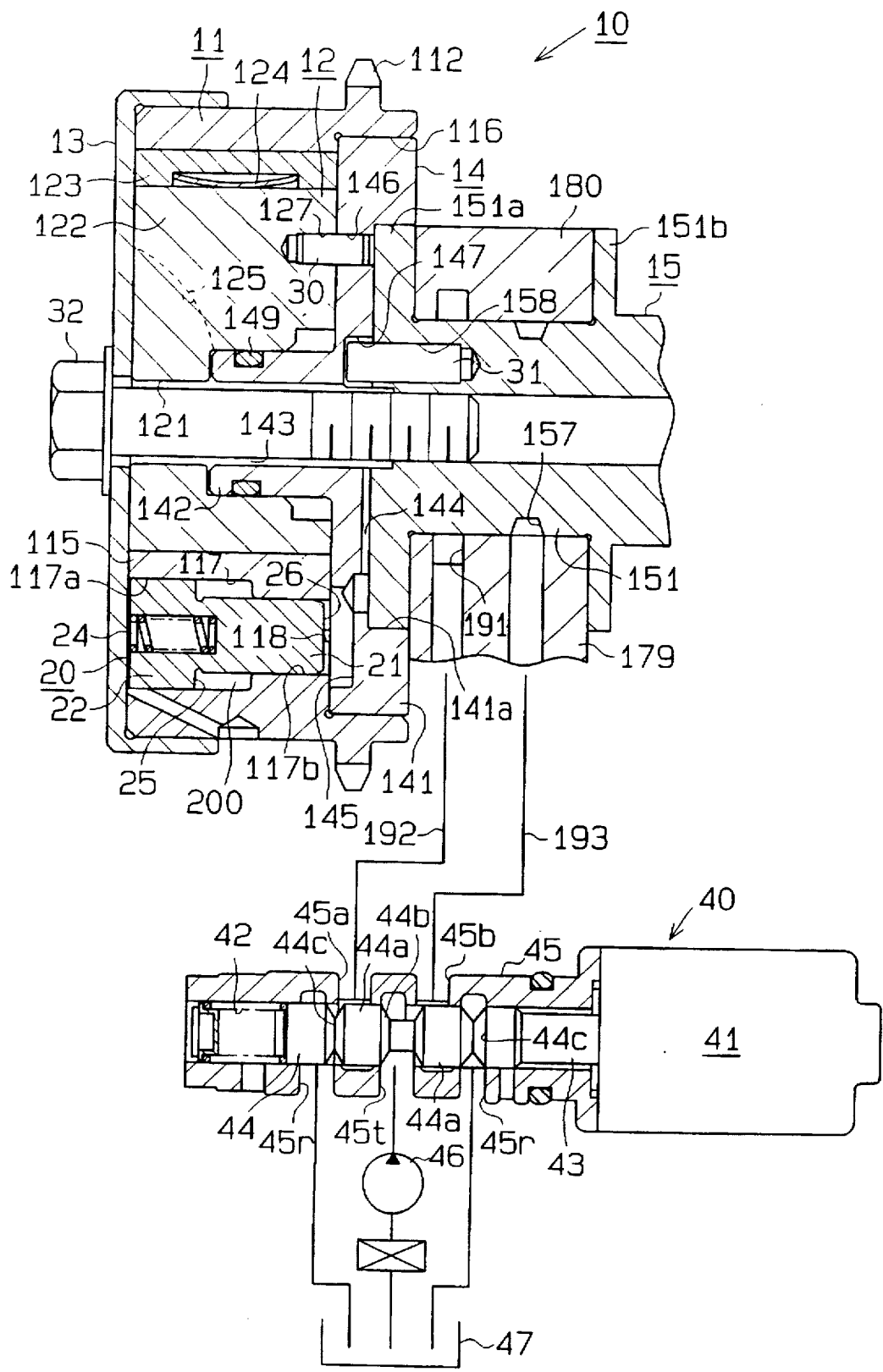
FIG. 4 is a cross-sectional view taken along line 4—4 of FIG. 3.

The rear plate 14 includes a disk portion 141 and a boss 142. A circular recess 141a is formed in the rear side of the boss 142. The rear plate 14 is fitted about the flange 151a at the recess 141a. A pin hole 158 is formed in the flange 151a of the camshaft 15. An engaging pin 31 is fixed in the hole 158 as seen in FIG. 4. The disk portion 141 of the rear plate 14 is provided with a pin hole 147. The pin 31 is engaged with the hole 147. This causes the rear plate 14 to rotate integrally with the camshaft 15.

The rotor 12 is provided with an axial bore 121. A step is defined in the bore 121. The rotor 12 also has four radially projecting vanes 122. Each vane 122 is equally spaced apart from the adjacent vanes 122. The rotor 12 is coaxially fitted about the boss 142 of the rear plate 14. A plurality of pin holes 146 are formed in the disk portion 141 of the rear plate 14. A plurality of engaging pins 30 (only one is shown) are fixed in the holes 146 as seen in FIG. 4. Each vane 122 has a pin hole 127. The pins 30 are engaged with the holes 127. This causes the rotor 12 to rotate integrally with the rear plate 14 and the camshaft 15. A seal 149 is located between the boss 142 and the rotor 12.

The sprocket 11 has a substantially cylindrical shape and is located about the disk portion 141 of the rear plate 14 and the rotor 12. The sprocket 11 has a circular recess 116, the diameter of which is substantially the same as that of the disk portion 141 of the rear plate 14. The disk portion 141 of the rear plate 14 fits within the recess 116. Thus, the sprocket 11 is rotatably supported on the rear plate 14.

The front end of the sprocket 11 and the rotor 12 are covered by a front cover 13. The cover 13 is fixed to the camshaft 15 by a bolt 32. This permits a relative rotation of the sprocket 11 with respect to the front cover 13. In other words, the front cover 13 rotates integrally with the rotor 12, rear plate 14, and the camshaft 15.

A plurality of teeth 112 are formed on the circumference of the sprocket 12. The teeth 112 are radially aligned with the recess 116. The chain 175 is meshed with the teeth 112. The sprocket 12 is provided with four projections 115 that project from the inner circumference of the sprocket 12 toward its axis. The projections 115 are equally spaced apart. Each pair of adjacent projections 115 define a vane chamber 114 for accommodating one of the vanes 122 of the rotor 12. The projections 115 also define a cylindrical space at the center part of the sprocket 12 for accommodating the cylindrical portion of the rotor 12. When the rotor 12 is accommodated in the sprocket 12, each vane 122 and the associated vane chamber 114 define an advance angle chamber 101 and a retard angle chamber 102 on the sides of the vane 122.

A seal 123 is fitted in the end of each vane 122 and is pressed against the inner wall of the associated vane chamber 114 by a leaf spring 124. Each seal 123 seals the corresponding advance angle chamber 101 and the retard angle chamber 102 from each other. When the chambers 101 and 102 are filled with oil, the pressure of the oil couples the rotor 12 to the sprocket 11. Thus, rotation of the sprocket 11 is transmitted to the rotor 12 by the oil. Accordingly, the camshaft 15 rotates with the rotor 12.

Figure 3:
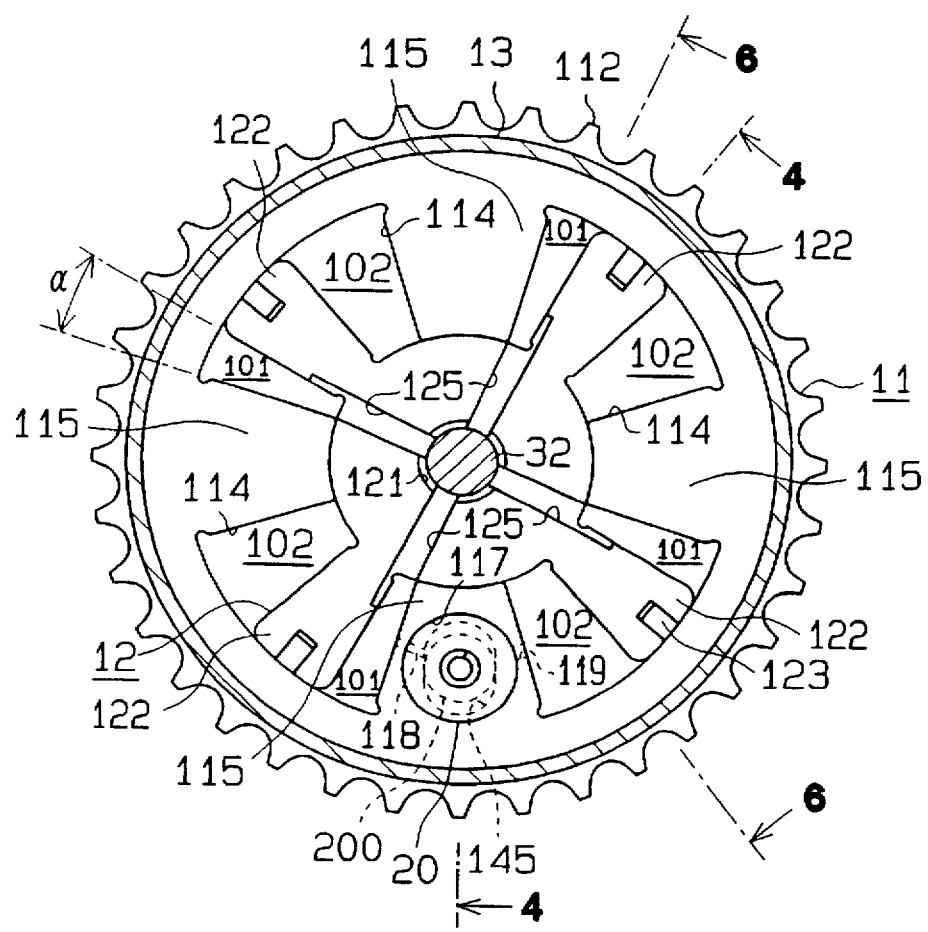
FIG. 3 is a cross-sectional a front view illustrating a variable valve timing mechanism.

If the pressure in the retard angle chambers 102 is greater than the pressure in the advance angle chambers 101, the vane 122 rotates counterclockwise as viewed in FIG. 3. When each vane 122 contacts the wall of the advance angle chamber 101, the camshaft 15 is located at the most retarded angle position with respect to the crankshaft 172. Contrarily, if the pressure in the advance angle chambers 101 is greater than the pressure in the retard angle chambers 102, the vane 122 rotates clockwise as viewed in FIG. 3. When each vane 122 contacts the wall of the retard angle chamber 102, the camshaft 15 is located at the most advanced angle position with respect to the crankshaft 172.

As shown in FIGS. 2 to 5, an accommodating bore 117 is formed in one of the projections 115 of the sprocket 11. The bore 117 extends in the axial direction axis of the camshaft 15 and has a step defined therein. A locking recess 145 is formed in the disk portion 141 of the rear plate 14. The recess 145 faces the bore 117 and has an oblong shape. That is, the length of the recess 145 in the radial direction of the plate 14 is longer than its width.

The bore 117 has a large diameter portion 117a and a small diameter portion 117b. A lock pin 20 is slidably accommodated in the bore 117. The lock pin 20 has a small diameter portion 21 at the rear end and a large diameter portion 22 at the front end. The large diameter portion 22 of the pin 20 is shorter than the large diameter portion 117a of the bore 117, and the small diameter portion 21 of the pin 20 is longer than the small diameter portion 117b of the bore 117. Therefore, an annular pressure chamber 200 is defined between the large diameter portion 22 of the pin 20 and the small diameter portion 117b of the bore 117.

The pressure of oil in the pressure chamber 200 acts on a step defined on the lock pin 20, or a first pressure receiving surface 25. The rear end face of the small diameter portion 21 of the lock pin 20 serves as a second pressure receiving surface 26. A spring 24 extends in a hole formed in the large diameter portion 22 of the lock pin 20 and contacts the front cover 13. The spring 24 urges the lock pin 20 in a direction causing engagement of the pin 20 with the locking recess 145. When the sum of the forces of pressure acting on the first pressure receiving surface 25 and on the second pressure receiving surface 26 is smaller than the force of the spring 24, the spring 24 causes the lock pin 20 to abut against the front face of the disk portion 141, or to be engaged with the locking recess 145 formed in the disk portion 141 of the rear plate 14.

When the lock pin 20 abuts against the disk portion 141, if the sprocket 11 rotates with respect to the rear plate 14 such that the lock pine 20 is aligned with the locking recess 145, the lock pin 20 enters the recess 145. This mechanically couples the sprocket 11 with the rear plate 14.

When the lock pin 20 is engaged with the locking recess 145, the rotor 12 is located at the position shown in FIG. 3. At this position, each vane 122 is advanced from the most retarded angle position by α degrees.

When the sum of the forces of pressure acting on the first pressure receiving surface 25 and pressure acting on the second pressure receiving surface 26 is greater than the force of the spring 24, the lock pin 20 is separated from the disk portion 141. This permits relative rotation between the sprocket 11 and the rear plate 14. In this state, the lock pin 20 is wholly accommodated in the bore 117 and is not abraded by the disk portion 141.

Passages for supplying oil to the advance angle chambers 101, the retard angle chambers 102, and the first and second pressure receiving surfaces 25, 26 will now be described. As shown in FIGS. 2 to 6, a cross-shaped advance angle passage 125 is formed in the front face of the rotor 12. The advance angle passage 125 communicates with each advance angle chamber 101. An annular advance angle groove 191 is formed in the inner wall of the bearing cap 180 and the cylinder head 179 about the journal 151. The groove 191 is connected to a hydraulic pump 26 by a passage 192 and an oil control valve (OCV) 40.

A pair of substantially L-shaped connection passages 155 are formed in the journal 151, and a space 143 is defined between the boss 142 and the bolt 32. The advance angle groove 191 is connected to the advance angle chambers 101 by the connection passages 155, the space 143 and the advance angle passage 125. The hydraulic pump 46 supplies oil to the passage 192 via the OCV 40. The oil is then supplied to the advance angle chambers 101 via the advance angle groove 191, the connection passages 155, the space 143 and the advance angle passage 125.

A cross-shaped retard angle passage 126 is formed in the rear face of the rotor 12. The passage 126 has substantially the same shape as the advance angle passage 125 and communicates with each retard angle passage 102. An annular retard angle passage 157 is formed in the circumference of the journal 151. The passage 157 is connected to the hydraulic pump 46 by a passage 193 and the OCV 40.

A pair of linear connection passages 156 are formed in the journal 151. The passages 156 extend in the axial direction of the camshaft 15. A pair of intermediate passages 84 are formed in the rear plate 14. The passages 84 connect the connection passage 156 with the retard angle passage 126. The hydraulic pump 46 supplies oil to the passage 193 via the OCV 40. The oil is then supplied to the retard angle chambers 102 via the retard angle groove 157, the connection passages 156, the intermediate passages 84 and the retard angle passage 126.

Figure 2:
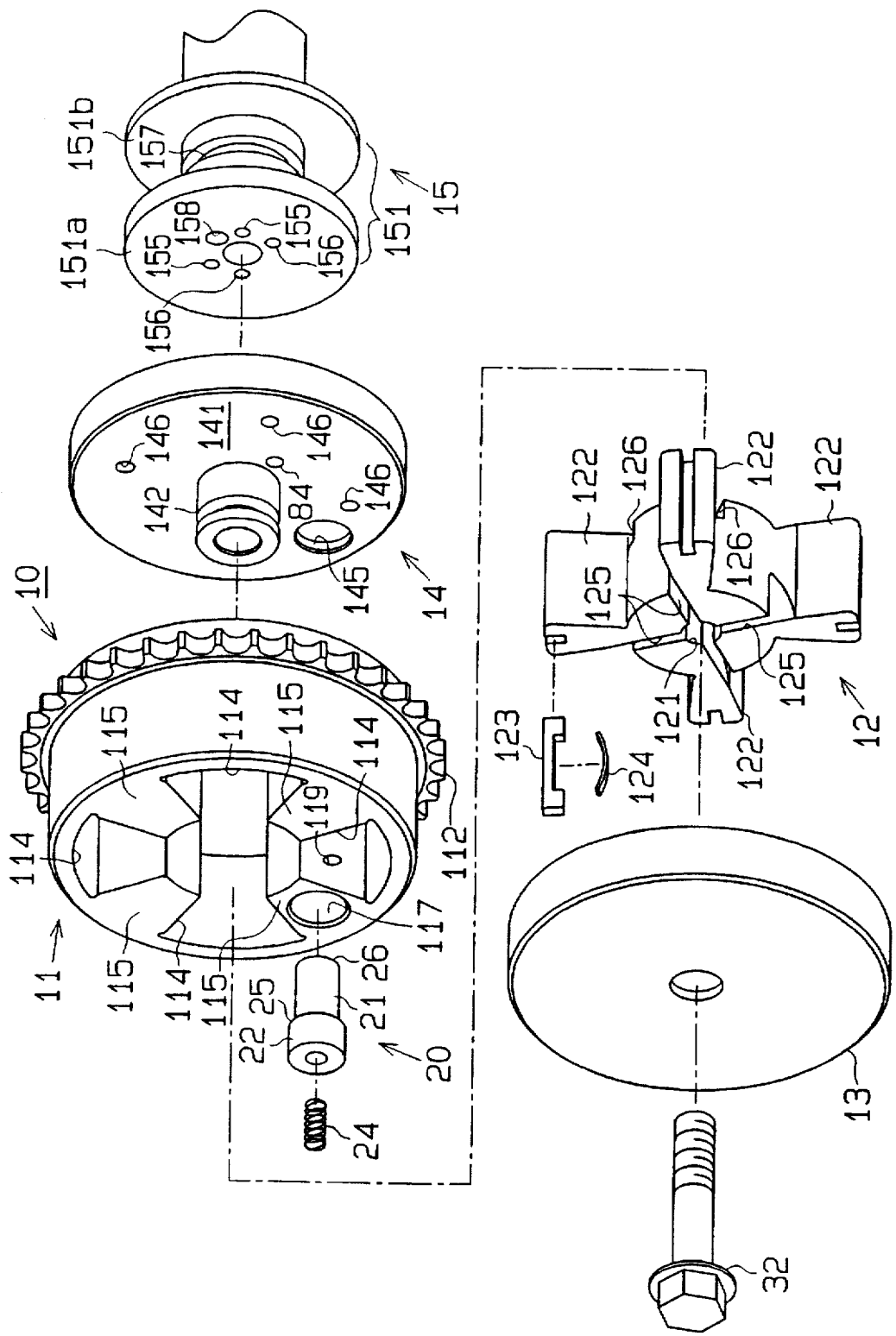
FIG. 2 is an exploded perspective view illustrating a variable valve timing mechanism according to the first embodiment of the present invention.

As shown in FIGS. 2 and 3, a retard angle communicating passage 119 is formed in the projection 115 that has the accommodating bore 117. The passage 119 connects the pressure chamber 200 defined in the accommodating bore 117 to the adjoining retard angle chamber 102. The pressure in the retard angle chamber 102 thus acts on the first pressure receiving surface 25 on the lock pin 20 via the communicating passage 119.

Figure 5:
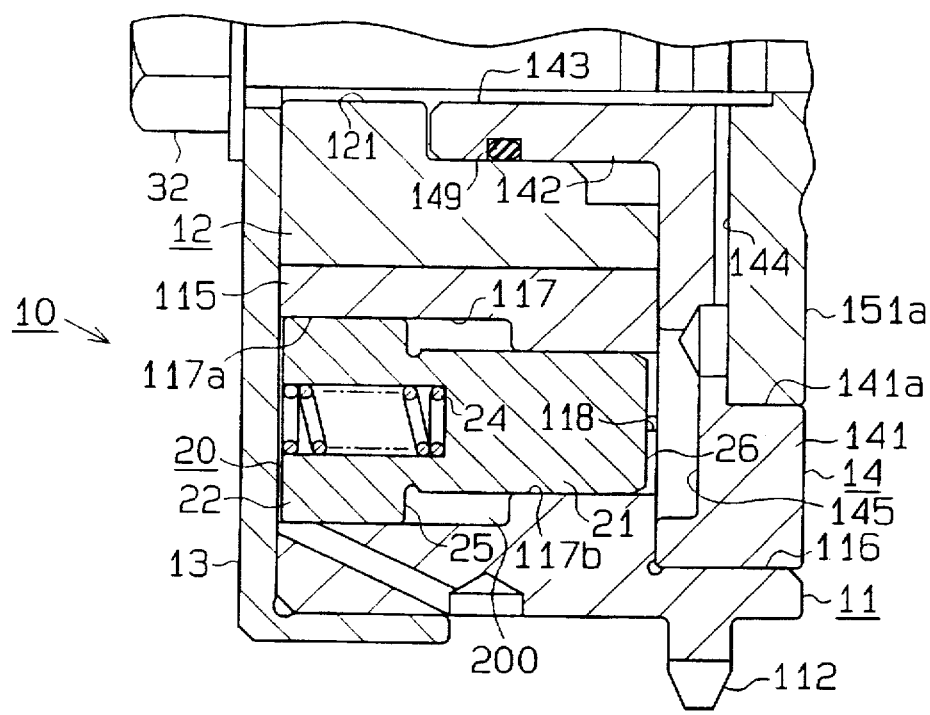
FIG. 5 is an enlarged partial cross-sectional view of FIG. 4.
Figure 6:
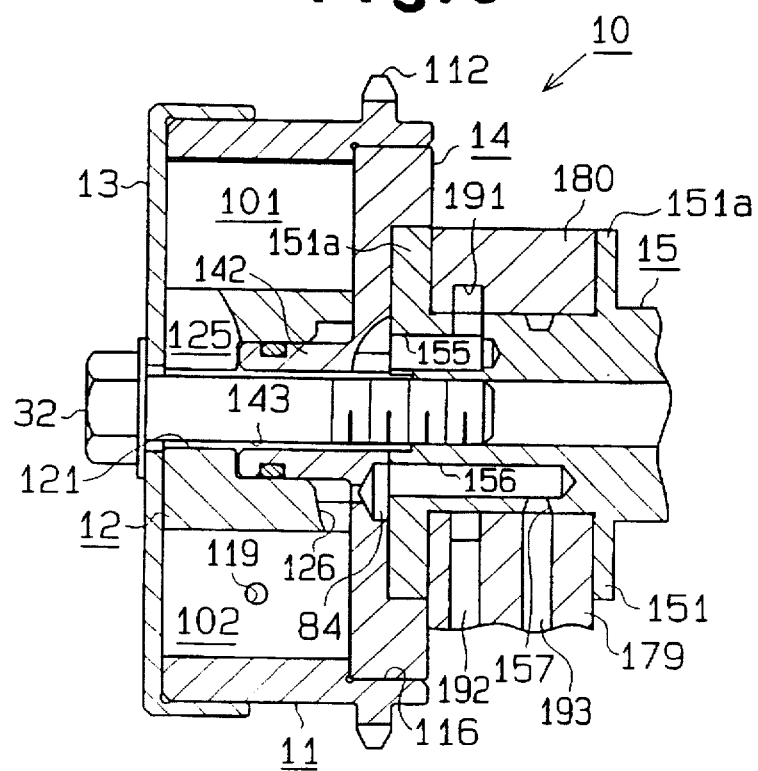
FIG. 6 is a cross-sectional view taken along line 6—6 of FIG. 3.

As shown in FIGS. 4 and 5, a radial passage 144 is formed in the rear face of the rear plate 14. The space 143 is connected to the locking recess 145 by the radial passage 144. The oil supplied to the space 143 thus directly acts on the second pressure receiving surface 26 of the lock pin 20 without the advance angle chambers 101 in between.

As shown in FIGS. 3 to 5, an advance angle communicating passage 118 is formed in the projection 115 that has the accommodating bore 117 formed therein. The passage 118 connects the accommodating bore 117 to the adjoining advance angle chamber 101 and supplies oil from the advance angle chamber 101 to the space between the second pressure receiving surface 26 and the front face of the rear plate 14. Therefore, the oil in the advance angle chamber 101 acts on the second pressure receiving surface 26 of the lock pin 20.

The OCV 40 is a control valve for controlling the course of oil that is supplied to the chambers 101 and 102. As shown in FIG. 4, the OCV 40 includes a casing 45, a spool 44 and an electromagnetic actuator 41. The spool 44 is a cylindrical valve body and is reciprocally accommodated in the casing 45. The actuator 41 is secured to an end of the casing 45 and includes a plunger 43. The plunger 43 abuts against the spool 44. A coil spring 42 is accommodated in the casing 45 for urging the spool 44 toward the plunger 43.

The casing 45 of the OCV 40 further has a tank port 45t, an A port 45a, a B port 45b and a pair of reservoir ports 45r. The tank port 45t is connected to an oil pan 47 with the hydraulic pump 46 in between. The A port 45a is connected to the advance angle groove 191 by the passage 192, and the B port 45b is connected to the retard angle groove 157 by the passage 193. The reservoir ports 45r are connected to the oil pan 47.

The actuator 41 is subjected to duty control and moves the spool 44 against or with the force of the spring 42.

The spool 44 is provided with a plurality of lands 44a. Reciprocation of the spool 44 causes the lands 44a to stop oil flow between the two ports (45a and 45t, 45a and 45r, 45b and 45t, 45b and 45r). A plurality of passages 44b, 44c are defined by the lands 44a. Reciprocation of the spool 44 also causes the passages 44b, 44c to permit oil flow between two ports (45a and 45t, 45a and 45r, 45b and 45t, 45b and 45r).

Duty control of the actuator 41 adjusts the cross sectional area of the passage between each pair of ports. This varies the flow rate of oil between each pair of ports, thereby controlling the pressure of oil that is supplied to the advance angle chambers 101 and the retard angle chambers 102.

The pressure of the oil that is supplied to the advance angle chambers 101 is higher than the pressure of the oil supplied to the retard angle chambers 102. When actuating the intake valves 177, the camshaft 15 receives reactive forces from the valves 177. The reactive forces displace the rotation phase of the camshaft 15 in the counterclockwise direction (as viewed in FIG. 3), or in the delayed angle direction. Therefore, in order to equalize the displacement speed of the camshaft 15 in the advance angle direction with displacement speed of the camshaft 15 in the retard angle direction, the pressure of the oil supplied to the advance angle chambers 101 needs to be higher than the pressure of the oil supplied to the retard angle chambers 102.

The force of the pressure acting on the first pressure receiving surface 25 urges the lock pin 20 in a direction causing disengagement of the pin 20 from the locking recess 145. The force based on the pressure acting on the second pressure receiving surface 26 also urges the lock pin 20 in a direction causing disengagement of the pin 20 from the locking recess 145. The area of the surface 25 and the area of the surface 26 are determined such the forces based on the pressure acting on the surfaces 25 and 26 are equalized. That is, the area A1 of the first pressure receiving surface 25 and the area A2 of the second pressure receiving surface 26 satisfy the following equation:

$$A1 \times \text{the pressure in the retard angle chambers } 102 \approx A2 \times \text{the pressure in the advance angle chambers } 101$$

Since the pressure of supplied to the advance angle chambers 101 is higher than the pressure of supplied to the retard angle chambers 102, the oil pressure acting on the first pressure receiving surface 25 of the lock pin 20 is lower than the oil pressure acting on the second pressure receiving surface 26. However, in order to stabilize the operation of the lock pin 20, the force of the pressure acting on the first pressure receiving surface 25 and the force of the pressure acting on the second pressure receiving surface 26 need to be substantially equalized.

When the engine is not running, the hydraulic pump 46 and the OCV 40 are not actuated. Therefore, oil is not supplied to the advance angle chambers 101 or the retard angle chambers 102. Oil pressure is not applied on the lock pin 20. When the engine is started, that is, when the engine is being cranked, very little oil pressure is produced. Thus, the lock pin 20 is either engaged with the lock recess 145 or is pressed against the front face of the rear plate 14 by the force of the spring 24.

If the sprocket 11 is rotated by cranking, and if the pin 20 is not already locked, the lock pin 20 is moved along the surface of the rear plate 14 and then is engaged with the lock recess 145. This mechanically couples the sprocket 11, the rotor 12, the rear plate 14 and the camshaft 15. Therefore, when the engine is started, the rotation phase of the camshaft 15 with respect to the sprocket 11 and crankshaft 72 is not varied.

When the lock pin 20 is engaged with the lock recess 145 in the rear plate 14, the rotation phase of the camshaft 15 is mechanically fixed. This rotation phase is advanced from the most retarded valve timing phase by α degrees. This produces the optimum valve timing for starting the engine, thereby improving the starting performance of the engine. Also, the valve timing may be delayed from the engine starting valve timing once the engine is running and the oil pressure reaches a normal operating level.

After the engine is started, if the hydraulic pump 46 produces sufficient oil pressure and the spool 44 is moved leftward (as viewed in FIG. 4), the passage 44b communicates the tank port 45t with the A port 45a. As a result, oil is supplied to the advance angle groove 191 by the hydraulic pump 46. The oil is then supplied to the advance angle chambers 101 via the connection passages 155 in the journal 151, the space 143 and the advance angle passage 125. This increases the oil pressure in the advance angle chambers 101.

At the same time, one of the passages 44c communicates the B port 45b with one of the reservoir ports 45r. This causes oil in the retard angle chambers 102 to be discharged to the oil pan 147 via the retard angle passage 126 in the rotor 12, the intermediate passages 84 in the rear plate 14, the connection passages 156 in the journal 151, the retard angle groove 157, the passage 193, the B port 45b and the reservoir port 45r of the OCV 40. This lowers the oil pressure in the retard angle chambers 102.

As shown in FIG. 5, the pressure of oil flowing to the advance angle chambers 101 acts on the second pressure receiving surface 26 of the lock pin 20 located upstream the chambers 101 via the space 143 and the radial passage 144 in the rear plate 14. The pressure of oil supplied to the advance angle chambers 101 also acts on the second pressure receiving surface 26 of the lock pin 20 via the communicating passage 118. Thus, the pressure acting on the surface 26 is increased by an increase in the amount of oil supplied to the advance angle chambers 101. When the force of the pressure acting on the second pressure receiving surface 26 is greater than the force of the spring 24, the lock pin 20 is disengaged from the lock recess 145 and is accommodated in the bore 117. This allows smooth relative rotation between the rotor 12 and the sprocket 11.

If oil pressure is already applied to the retard angle chambers 102, the lock pin 20 is maintained in the bore 117 by the force of the pressure acting on the first pressure receiving surface 25. The pressure acting on the first pressure receiving surface 25 is decreased as the pressure in the retard angle chambers 102 lowers. However, since the pressure acting on the second pressure receiving surface 26 increases, the lock pin 20 is retained in the bore 117.

When the pressure in the advance angle chambers 101 increases and the pressure in the retard angle chambers 102 lowers, the pressure difference between the chambers 101 and 102 causes the rotor 12 to rotate clockwise with respect to the sprocket 11 as viewed in FIG. 3. This applies a rotating force to the intake camshaft 15 through the rear plate 14, thereby changing the rotation phase of the intake camshaft 15 with respect to the sprocket 11, or the crankshaft 171. That is, the camshaft 15 is rotated to an advanced angle position. This rotation of the camshaft 15 advances the times at which the intake valves 177 are opened.

Accordingly, the intake valves 177 are opened when the exhaust valves 178 are opened. This prolongs the valve overlap during which the intake valves 177 and the exhaust valves 178 are opened.

If the OCV 40 moves the spool 44 rightward as viewed in FIG. 4 after the engine is started, the passage 44b communicates the tank port 45t with the B port 45b. In this state, oil is supplied to the retard angle groove 157 by the pump 45 via the passage 193. The oil is then supplied to the retard angle chambers 102 via the connection passages 156, the intermediate passages 84 and the retard angle passage 126. Thus, the oil pressure in the retard angle chambers 102 is increased.

At the same time, one of the passages 44c communicates the A port 45a with one of the reservoir port 45r. This causes oil in the advance angle chambers 101 to be discharged to the oil pan 147 via the advance angle passage 125 in the rotor 12, the space 143, the connection passages 155 in the journal 151, the advance angle groove 191, the passage 192, and the A port 45a and the reservoir port 45r of the OCV 40. This lowers the oil pressure in the advance angle chambers 101.

As shown in FIG. 3, the pressure of oil supplied to the retard angle chambers 102 acts on the first pressure receiving surface 25 of the lock pin 20 via the connection passage 119. When oil is initially supplied to the retard angle chambers 102 after the engine is started, if the force of the pressure acting on the first pressure receiving surface 25 is greater than the force of the spring 24, the lock pin 20 is disengaged from the lock recess 145 and is fully retracted in the bore 117. This permits smooth relative rotation between the rotor 12 and the sprocket 11.

If oil pressure is already applied to the advance angle chambers 101, the lock pin 20 is accommodated in the bore 117 by the force of the pressure acting on the second pressure receiving surface 26. The pressure acting on the second pressure receiving surface 26 is decreased as the pressure in the advance angle chambers 101 lowers. However, since the pressure acting on the first pressure receiving surface 25 increases, the lock pin 20 is retained in the bore 117.

When the pressure in the retard angle chambers 102 increases and the pressure in the advance angle chambers 101 lowers, the pressure difference between the chambers 101 and 102 causes the rotor 12 to rotate counterclockwise as viewed in FIG. 3 with respect to the sprocket 11. This applied a rotating force to the intake camshaft 15 through the rear plate 14, thereby changing the rotation phase of the intake camshaft 15 with respect to the sprocket 11, or the crankshaft 172. That is, the camshaft 15 is rotated to a retarded angle position. This rotation of the camshaft 15 retards the times at which the intake valves 177 are opened. Accordingly, valve overlap is decreased or eliminated.

When the engine is stopped, the hydraulic pump 46 stops operating. Oil supply to the engine is stopped, accordingly. The spool 44 in the OCV 40 is moved to the position illustrated in FIG. 4 by the force of the spring 42. In this position, the passage 44b communicates the B port 45b with the tank port 45t. This connects the retard angle chambers 102 to the oil pan 47. Since the pump 46 is not operating, oil in the retard angle chambers 102 flows into the oil pan 47. In this position, one of the passages 44c communicates the A port 45a with one of the reservoir ports 45r. This allows oil in the advance angle chambers 101 to flow into the oil pan 47 via the ports 45a and 45r.

When the oil flows to the oil pan 47, the pressure acting on the first pressure receiving surface 25 or the pressure acting on the second pressure receiving surface 26 is lowered, accordingly. This allows the lock pin 20 to be moved toward the rear plate 14 by the force of the spring 24. When the engine is stopped, the reactive force of the intake valves 177 rotates the camshaft 15, the rear plate 14 and the rotor 12 in the retarded angle direction. In other words, the rotor 12 rotates counterclockwise as viewed in FIG. 3. If this rotation causes the lock recess 145 to be aligned with the lock pin 20, the lock pin 20 enters the recess 145. This restricts the relative rotation between the rotor 12 and the sprocket 11. If the recess 145 is not aligned with the lock pin 20, the lock pin 20 remains abutting the front face of the rear plate 14 until the engine is restarted.

As described above, oil pressure is constantly applied to the first pressure receiving surface 25 or the second pressure receiving surface 26 of the lock pin 20 when the rotor 12 rotates with respect to the sprocket 11, or when the valve timing is being changed. This prevents the lock pin 20 from protruding from the bore 117 when the valve timing is changed. Thus, the lock pin 20 and the rear plate 14 do not abrade each other, and there is no frictional resistance between the lock pin 20 and the rear plate 14. This permits smooth relative rotation between the rotor 12 and the sprocket 11.

The vanes 122 of the inner rotor 12 secured to the camshaft 15 are directly affected by torque fluctuation of the camshaft 15. That is, torque fluctuation of the camshaft 15 fluctuates the vanes 122. This causes the oil pressure in the advance angle chambers 101 and the retard angle chambers 102 to oscillate. However, when oil is supplied to the advance angle chambers 101 via the space 143, the pressure of oil in the space 143 directly acts on the second pressure receiving surface 26 of the lock pin 20 via the radial passage 144 without the chambers 101 in between. That is, the oil pressure acting on the second pressure receiving surface 26 is not affected by pressure fluctuation in the advance angle chambers 101. Accordingly, the pressure acting on the lock pin 20 remains constant. This further ensures the accommodation of the lock pin 20 in the bore 117. Moreover, noise of the lock pin 20 hitting the rear plate 14 is prevented.

A VVT 50 according to a second embodiment of the present invention will now be described with reference to FIGS. 7 to 10. Like or the same reference numerals are given to those components that are like or the same as the corresponding components of the first embodiment.

Figure 7:
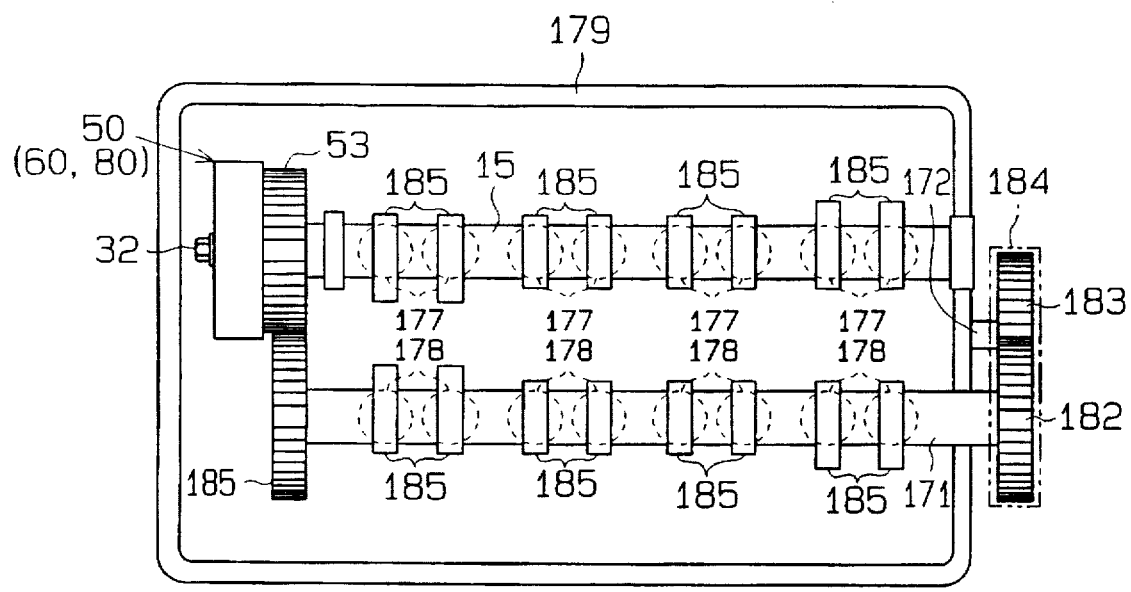
FIG. 7 is a plan view illustrating a valve train according to second to fourth embodiments of the present invention.

FIG. 7 is a plan view illustrating a valve train that includes the VVT 50. An intake camshaft 15 and an exhaust camshaft 171 are rotatably supported on a cylinder head 179. The exhaust camshaft 171 and the crankshaft 172 are operably connected by pulleys 182, 183 and a timing belt 184. A driven gear 53 on the intake camshaft 15 is meshed with a driving gear 185 on the exhaust camshaft 171. The VVT 50 is provided on the intake camshaft 15.

Rotation of the crankshaft 172 is transmitted to the exhaust camshaft 171 by the pulleys 182, 183 and the belt 184. The torque of the exhaust camshaft 171 is transmitted to the intake camshaft 15 via the gears 185, 53, thereby rotating the camshaft 15. Accordingly, the camshafts 15, 171 are rotated and actuate intake valves 177 and exhaust valves 178 by cams 186 on the camshaft 15, 171 at a predetermined valve timing.

The VVT 50 includes a front cover 13, a rotor 51, a housing 52, the driven gear 53 and the intake camshaft 15.

Figure 9:
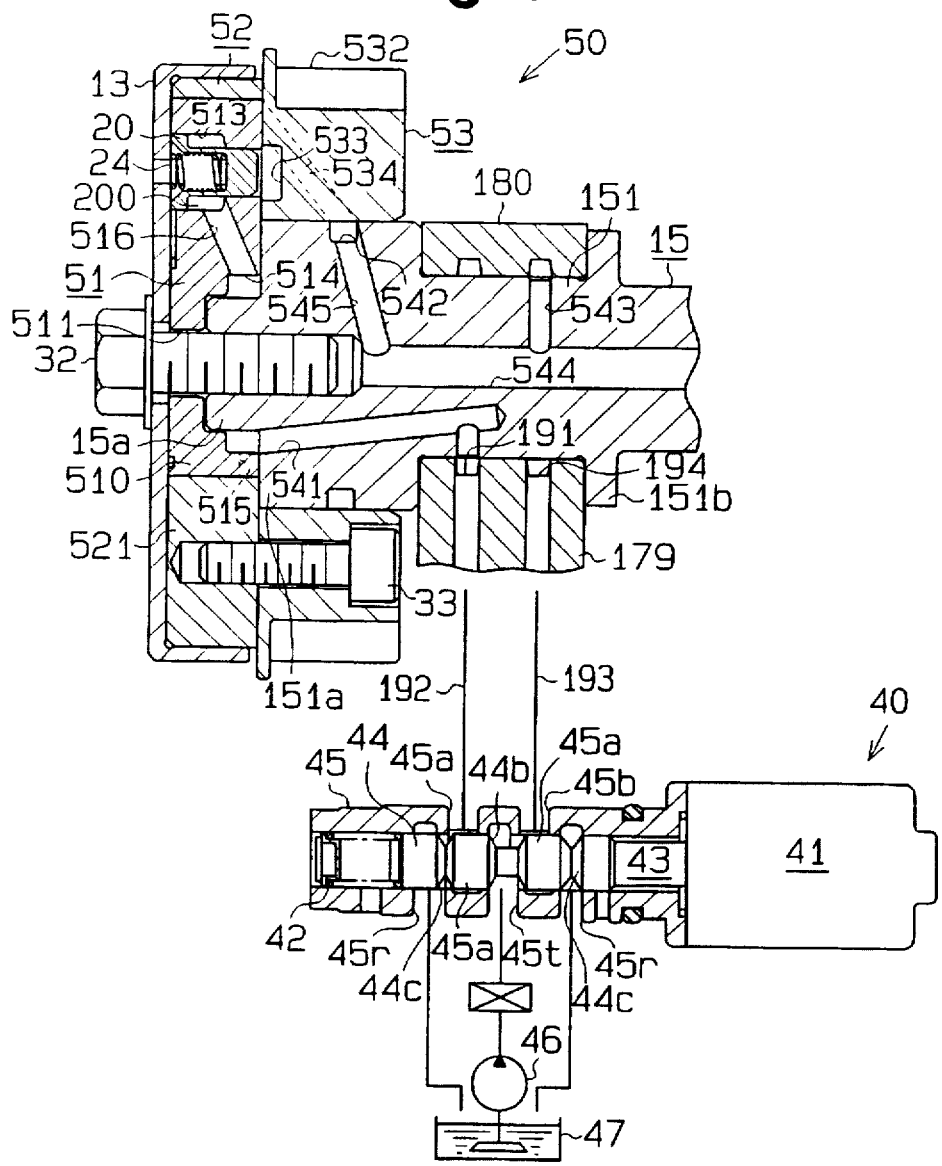
FIG. 9 is a cross-sectional view taken along line 9—9 of FIG. 8.

As shown in FIG. 9, the driven gear 53 has a substantially cylindrical shape and is rotatably fitted about a flange 151a that is located at the front end of the camshaft 15. A plurality of teeth 532 are formed on the circumference of the driven gear 53. The teeth 532 are meshed with the driving gear 185 on the exhaust camshaft 171.

Figure 8:
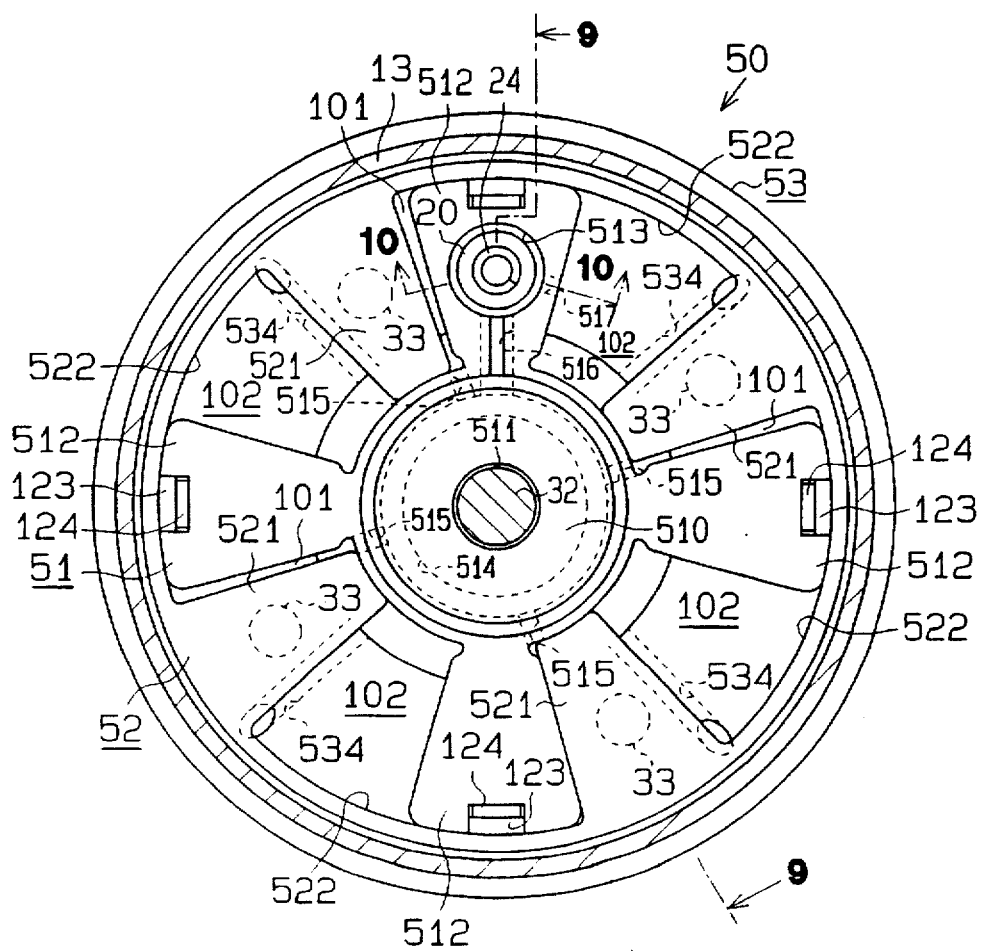
FIG. 8 is a cross-sectional front view illustrating a variable valve timing mechanism according to the second embodiment.

As shown in FIGS. 8 and 9, the housing 52 has a substantially cylindrical shape and is secured to the front face of the driven gear 53 by a bolt 33. This permits the housing 52 to integrally rotate with the driven gear 53. The housing 52 is provided with four projections 521 that project from the inner circumference of the housing 52 toward its axis. The projections 521 are equally spaced apart. Each pair of adjacent projections 521 define a vane chamber 522.

The camshaft 15 is provided with a boss 15a at one end. The rotor 51 includes a cylindrical portion 510. An axial bore 511 is formed in the cylindrical portion 510 and has a step defined therein. The cylindrical portion 510 also has four radially projecting vanes 512. Each vane 512 is equally spaced apart from the adjacent vanes 512. The rotor 51 is coaxially fitted about the boss 15a of the camshaft 15. The rotor 51 rotates integrally with the camshaft 15. The cylindrical portion 510 of the rotor 51 is accommodated in a cylindrical space defined by the projections 521 at the center part of the housing 52, while each vane 512 is accommodated in one of the vane chamber 522. Each vane 512 and the associated vane chamber 522 define an advance angle chamber 101 and a retard angle chamber 102. A seal 123 is fitted in the end of each vane 512 and pressed against the inner wall of the associated vane chamber 522 by a leaf spring 124.

The front cover 13 is coaxially fitted about the housing 52 to cover the front end of the housing 52 and the rotor 51. The cover 13 is fixed to the camshaft 15 by a bolt 32. This permits relative rotation of the housing 52 with respect to the front cover 13. In other words, the front cover 13 rotates integrally with the rotor 51 and the camshaft 15.

Figure 10:
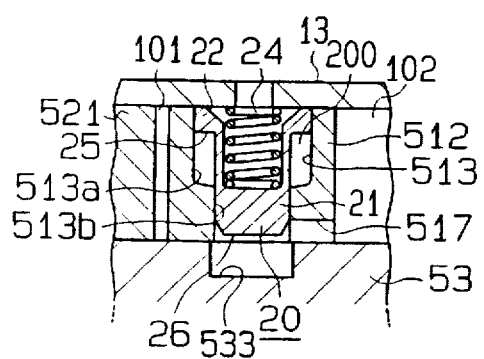
FIG. 10 is an enlarged partial cross-sectional view taken along line 10—10 of FIG. 8.

As shown in FIGS. 8 to 10, an accommodating bore 513 is formed in one of the vanes 512 of the rotor 51. A locking recess 533 is formed in the front face of the driven gear 53. The recess 533 faces the bore 513.

As in the first embodiment, the bore 513 has a large diameter portion 513a and a small diameter portion 513b. A lock pin 20 is slidably accommodated in the bore 513. The lock pin 20 has a small diameter portion 21 and a large diameter portion 22. An annular pressure chamber 200 is defined between the large diameter portion 22 of the pin 20 and the small diameter portion 513b of the bore 513. The lock pin 20 is urged toward the locking recess 533 by a spring 24.

Passages for supplying oil to the advance angle chambers 101, the retard angle chambers 102, and the first and second pressure receiving surfaces 25, 26 of the lock pin 20 will now be described. As shown in FIGS. 8 to 9, an annular passage 514 is defined between the bore 522 of the rotor 51 and the boss 15a of the camshaft 15. A plurality of advance angle passages 515 are formed in the rear face of the rotor 51. Each passage 515 connects one of the advance angle chambers 101 with the annular passage 514. An annular advance angle groove 191 is formed in the inner wall of the cylinder head 179 and the bearing cap 180. The groove 191 is communicated with the passage 192. An L-shaped connection passage 541 is formed in the journal 151 for connecting the annular passage 514 with the advance angle groove 191. The hydraulic pump 46 supplies oil to the passage 192 via the OCV 40. The oil is then supplied to the advance angle chambers 101 via the advance angle groove 191, the connection passages 541, the annular passage 514 and the advance angle passage 515. The OCV 40 of this embodiment has the same construction as that of the first embodiment.

The pressure chamber 200 defined in the accommodating bore 513 is connected to the annular passage 514 by the radial passage 516 formed in the rotor 51. This allows the pressure of oil supplied to the annular passage 514 to directly act on the first pressure receiving surface 25 of the lock pin 20 without an advance angle chamber 101 in between.

An annular retard angle groove 194 is formed in the inner wall of the cylinder head 179 and the bearing cap 180. The groove 194 is communicated with the passage 193. An annular communicating groove 542 is formed in the circumference of the flange 151a of the journal 151 and faces the inner wall of the driven gear 53. Passages 543, 544 and 545 are formed in the journal 151 for connecting the retard angle groove 194 with the communicating groove 542. A plurality of retard angle passages 534 are formed in the driven gear 53 for connecting the communicating groove 542 with each retard angle chamber 102. The hydraulic pump 46 supplies oil to the passage 193 via the OCV 40. The oil is then supplied to the retard angle chambers 102 via the retard angle groove 194, the connection passages 543, 544, 545, the communicating groove 542 and the retard angle passage 534.

As shown in FIGS. 8 and 10, a communicating groove 517 is formed in the surface of one of the vanes 512 facing the driven gear 53 for communicating the accommodating bore 513 with the adjoining retard angle chamber 102. Oil in the retard angle chamber 102 is supplied to the space between the second pressure receiving surface 26 and the front face of the driven gear 53 by the groove 517. Therefore, the pressure in the retard angle chambers 102 acts on the second pressure receiving surface 26 of the lock pin 20.

Contrary to the first embodiment, the pressure of oil supplied to the advance angle chambers 101 acts on the first pressure receiving surface 25 of the lock pin 20, and the pressure of oil supplied to the retard angle chambers 102 acts on the second pressure receiving surface 26 of the lock pin 20. Therefore, the area A1 of the first pressure receiving surface 25 and the area A2 of the second pressure receiving surface 26 satisfy the following equation:

A1×the pressure in the advance angle chambers 101≈A2× the pressure in the retard angle chambers 102

The left and right portions of the equation represent the forces of the pressure acting on the first pressure receiving surface 25 and the second pressure receiving surface 26, respectively. As seen in the equation, the forces have substantially the same magnitude, and urge the lock pin in a direction causing disengagement of the lock pin 20 from the lock recess 533.

When the engine is started, that is, when the engine is being cranked, very little oil pressure is produced. Thus, the lock pin 20 is engaged with the lock recess 533 of the driven gear 53 by the force of the spring 24. This mechanically couples the rotor 51, the housing 52, the driven gear 53 and the camshaft 15. Therefore, when the engine is started, the rotation phase of the camshaft 15 with respect to the driven gear 53 and the crankshaft 172 is not varied.

After the engine is started, if the hydraulic pump 46 produces sufficient oil pressure and the spool 44 is moved leftward (as viewed in FIG. 9), the passage 44b communicates the port 45t with the A port 45a. As a result, oil is supplied to the advance angle groove 191 by the hydraulic pump 46. The oil is then supplied to the advance angle chambers 101 via the connection passage 541, the annular passage 514 and the advance angle passage 515. This increases the oil pressure in the advance angle chambers 101.

At the same time, one of the passage 44c communicates the B port 45b with one of the reservoir ports 45r. This causes oil in the retard angle chambers 102 to be discharged to the oil pan 147 via the retard angle passage 534, the communicating groove 542, the connection passages 545, 544, 543, the retard angle groove 194, the passage 193, the B port 45b and the reservoir port 45r of the OCV 40. This lowers the oil pressure in the retard angle chambers 102.

The oil flowing to the advance angle chambers 101 is introduced to the pressure chamber 200, which is located upstream of the chambers 101, via the annular passage 514 and the radial passage 516. The pressure of oil in the pressure chamber 200 acts on the first pressure receiving surface 25 of the lock pin 20. When the force of the pressure acting on the first pressure receiving surface 25 is greater than the force of the spring 24, the lock pin 20 is disengaged from the lock recess 533 and is accommodated in the bore 513. This allows smooth relative rotation between the rotor 51 and the driven gear 53.

The oil pressure acting on the first pressure receiving surface 25 is not affected by pressure fluctuation in the advance angle chambers 101 caused by torque fluctuation of the camshaft 15. Accordingly, the pressure acting on the lock pin 20 remains constant. This ensures that of the lock pin 20 is maintained in the bore 513.

If oil pressure is already applied to the retard angle chambers 102, the lock pin 20 is maintained in the bore 513 by the force of the pressure acting on the second pressure receiving surface 26. The pressure acting on the second pressure receiving surface 26 is decreased at the pressure in the retard angle chambers 102 lowers. However, since the pressure acting on the first pressure receiving surface 25 increases, the lock pin 20 is retained in the bore 513.

When the pressure in the advance angle chambers 101 increases and the pressure in the retard angle chambers 102 lowers, the pressure difference between the chambers 101 and 102 causes the rotor 51 to rotate clockwise with respect to the housing 52 as viewed in FIG. 8. This changes the rotation phase of the intake camshaft 15 with respect to the driven gear 53, or the crankshaft 171. That is, the camshaft 15 is rotated to an advanced angle position. This rotation of the camshaft 15 advances the times at which the intake valves 177 are opened.

If the OCV 40 moves the spool 44 rightward as viewed in FIG. 9 after the engine is started, the passage 44b communicates the tank port 45t with the B port 45b. In this state, oil is supplied to the retard angle groove 194 by the pump 45 via the passage 193. The oil is then supplied to the retard angle chambers 102 via the connection passages 543, 544, 545, the connection passages 542 and the retard angle passage 534. Thus, the oil pressure in the retard angle chambers 102 is increased.

At the same time, one of the passages 44c communicates the A port 45a with one of the reservoir port 45r. This causes oil in the advance angle chambers 101 to be discharged to the oil pan 147 via the advance angle passage 515, the annular passage 514, the connection passages 541, the advance angle groove 191, the passage 192, and the A port 45a and the reservoir port 45r of the OCV 40. This lowers the oil pressure in the advance angle chambers 101.

As shown in FIG. 10, the pressure of oil supplied to the retard angle chambers 102 acts on the second pressure receiving surface 26 of the lock pin 20 via the communicating groove 517. When oil is initially supplied to the retard angle chambers 102 after the engine is started, if the force of the pressure acting on the second pressure receiving surface 26 is greater than the force of the spring 24, the lock pin 20 is disengaged from the lock recess 533 and is fully retracted in the bore 513. This permits smooth relative rotation between the rotor 51 and the driven gear 53.

If oil pressure is already applied to the advance angle chambers 101, the lock pin 20 is held in the bore 513 by the force of the pressure acting on the first pressure receiving surface 25. The pressure acting on the first pressure receiving surface 25 is decreased as the pressure in the advance angle chambers 101 lowers. However, since the pressure acting on the second pressure receiving surface 26 increases, the lock pin 20 is retained in the bore 513.

When the pressure in the retard angle chambers 102 increases and the pressure in the advance angle chambers 101 lowers, the pressure difference between the chambers 101 and 102 causes the rotor 51 to rotate counterclockwise as viewed in FIG. 8 with respect to the housing 52. This changes the rotation phase of the intake camshaft 15 with respect to the driven gear 53, or the crankshaft 171. That is, the camshaft 15 is rotated to a retarded angle position. This rotation of the camshaft 15 retards the times at which the intake valves 177 are opened.

When the engine is stopped, the oil in the advance angle chambers 101 and the retard angle chambers 102 flows into the oil pan 47. At this time, the pressure acting on the first pressure receiving surface 25 or the pressure acting on the second pressure receiving surface 26 is lowered, accordingly. This allows the lock pin 20 to be moved toward the driven gear 53 by the force of the spring 24. If the lock recess 533 is aligned with the lock pin 20, the lock pin 20 enters the recess 533.

As described above, in the VVT 50, as in the VVT 10 of the first embodiment, oil pressure is constantly applied to the first pressure receiving surface 25 or the second pressure receiving surface 26 of the lock pin 20 when the rotor 51 rotates with respect to the driven gear 53, or when the valve timing is being changed. Therefore, the second embodiment has the same advantages and effects as the first embodiment.

As passage for connecting the communicating groove 542 with the lock recess 533 may be formed in the driven gear 53. In this case, the pressure of oil supplied to the communicating groove 542 directly acts on the second pressure receiving surface 26 of the lock pin 20 without a retard angle chamber 102 in between.

A VVT 60 according to a third embodiment of the present invention will now be described with reference to FIGS. 11 to 13. Like the VVT 50 according to the second embodiment, the VVT 60 is suitable for the valve train shown in FIG. 7. Like or the same reference numerals are given to those components that are like or the same as the corresponding components of the first embodiment.

In the VVT 60, oil pressure constantly acts on a pressure receiving surface 73 of a lock pin 70 regardless of the operation state of the OCV 160.

The VVT 60 includes a front plate 61, a driven gear 62, a rotor 63, a disk-shaped rear plate 64 and an intake camshaft 15.

A circular recess 641 is formed in the rear face of the rear plate 64. The rear plate 64 is coaxially fitted about the flange 151a of the camshaft 15 at the recess 641. A pin hole 647 is formed in the rear plate 64. An engaging pin 646 projects forward from the flange 151a and is engaged with the pin hole 647. This causes the rear plate 64 to rotate integrally with the camshaft 15.

The rotor 63 includes a cylindrical portion 631. The cylindrical portion 631 is provided with an axial bore 631a. The cylindrical portion 631 also has four radially projecting vanes 632. Each vane 632 is equally spaced apart from the adjacent vanes 632. The rotor 63 is coaxially secured to the front face of the rear plate 64 with an engaging pin 34 in between. Therefore, the rotor 63 rotates integrally with the rear plate 64 and the camshaft 15.

The driven gear 62 has a substantially cylindrical shape and is coaxially fitted about the rear plate 64 and the rotor 63. A circular recess 626 is formed in the rear end of the driven gear 62. The driven gear 62 is rotatably fitted about the rear plate 64 at the recess 626. A plurality of teeth 622 are formed on the circumference of the driven gear 62. The teeth 622 are meshed with the driving gear 185 on the exhaust camshaft 171 illustrated in FIG. 7.

The front plate 61 has a bore 61a and covers the front face of the driven gear 62 and the rotor 63. A plurality of bolts 35 are accommodated in bores formed in the front plate 61 and project rearward. The bolts 35 extend in vanes 632 of the rotor 63 and the rear plate 64, and are screwed in the flange 151a of the journal 151. This secures the front plate 61, the rotor 63 and the rear plate 64 to the camshaft 15, thereby causing the front plate 61, the rotor 63 and the rear plate 64 to rotate integrally with the camshaft 15. The front inner circumference of the driven gear 62 is rotatably fitted about the front plate 61. A seal 611 is located between the front plate 61 and the driven gear 62 to seal between the plate 61 and the gear 62.

The driven gear 62 is provided with four projections 624 that project from the inner circumference of the gear 62 toward its axis. The projections 624 are equally spaced apart. Each pair of adjacent projections 624 define a vane chamber 623 for accommodating one of the vanes 632 of the rotor 63. The projections 624 also define a cylindrical space at the center part of the driven gear 62 for accommodating the cylindrical portion 631 of the rotor 63. When the rotor 63 is accommodated in the driven gear 62, each vane 632 and the associated vane chamber 623 define an advance chamber 101 and a retard angle chamber 102 at the sides of the vane 632.

A seal 123 is fitted in the end of each vane 632 and is pressed against the inner wall of the associated vane chamber 623 by a leaf spring 124. Similarly, a seal 123 fitted in the end of each projection 624 and is pressed against the cylindrical portion 631 of the rotor 63 by a leaf spring 124.

An accommodating bore 627 is formed in one of the projections 624 of the driven gear 62. The bore 627 extends in the axial direction of the camshaft 15. A locking recess 644 is formed in the front face of the rear plate 64. The recess 644 faces the bore 627. A lock pin 70 is slidably accommodated in the bore 627 and is urged toward with the lock recess 644 by a spring 71. The distal end of the lock pin 70 serves as a pressure receiving surface 73.

A circular recess 64a is formed in the front face of the rear plate 64. The recess 64a has the same diameter as the bore 631a of the rotor 63 and is aligned with the bore 631a. An OCV 160 is accommodated in the bore 61a of the front plate 61, the bore 631 of the rotor 63 and the recess 64a of the rear plate 62, and is aligned with the axis of the camshaft 15.

The VVT 60 is assembled according to the following procedure. Firstly, the rear plate 64 is mounted on the flange 151a of the journal 151. Next, the driven gear 62 and the rotor 63 are mounted on the rear plate 64. Then, the lock pin 70 is accommodated in the accommodating bore 627 and the OCV 160 is accommodated in the recess 64a and the bore 631a. Finally, the front plate 61 is attached to the assembly by the bolts 35.

The OCV 160 includes a cylindrical casing 161, a reciprocating spool 162, which is accommodated in the casing 161, and an electromagnetic actuator 163. The electromagnetic actuator 163 includes a plunger 164. The plunger 164 is coupled to a rod 165 that is integrally formed with the spool 162. A coil spring 166 urges the plunger 164 away from the casing 161.

Passages for supplying oil to the advance angle chambers 101, the retard angle chambers 102 and the pressure receiving surface 73 of the lock pin 70 will now be described. A passage 195 is formed in the cylinder head 179 and is connected to an oil pan 47 via an oil pump 46. An annular groove 159 is formed in the circumference of the journal 151 and is connected to the passage 195. A recess 653 is formed in the front face of the journal 151. A step is defined in the recess 653. The recess 653 and the rear plate 64 define an oil chamber 653a. A passage 655 and a pair of passages 654 are formed in the journal 151 for connecting the oil chamber 653a with the annular groove 159.

An annular supply groove 633 is formed in the inner circumference of the bore 631a of the rotor 63. A connection passage 643 is formed in the rear plate 64 for connecting the supply groove 63 with the oil chamber 653a. A supply hole 642 is formed in the rear plate 64 and communicates with the lock recess 644. A communicating groove 656 is formed in the front face of the flange 151a for connecting the supply hole 642 with the oil chamber 653a.

An annular groove 162a is formed in the circumference of the spool 162 of the OCV 160. A plurality of supply ports 161a are formed in the casing 161 for connecting the annular groove 162a with the supply groove 633. A plurality of advance angle ports 161b and a plurality of retard angle ports 161c are formed in the casing 161 and are located on both sides of the supply ports 161a.

A cross-shaped advance angle passage 636 is formed in the rear face of the rotor 63. The advance angle passage 636 communicates each advance angle chamber 101 with one of the advance angle ports 161b. A cross-shaped retard angle passage 637 is formed in the front face of the rotor 63. The retard angle passage 637 communicates each retard angle chamber 102 with one of the retarded angle ports 161c.

A discharge passage 166 is formed in the spool 162. A space 167 is defined between the front face of the spool 162 and the casing 161. A plurality of bores 162b are formed in the spool 162 for communicating the space 167 with the discharge passage 166. The space 167 is connected to the oil pan 47 via a discharge hole 168 formed in the casing 161.

Figure 13A:
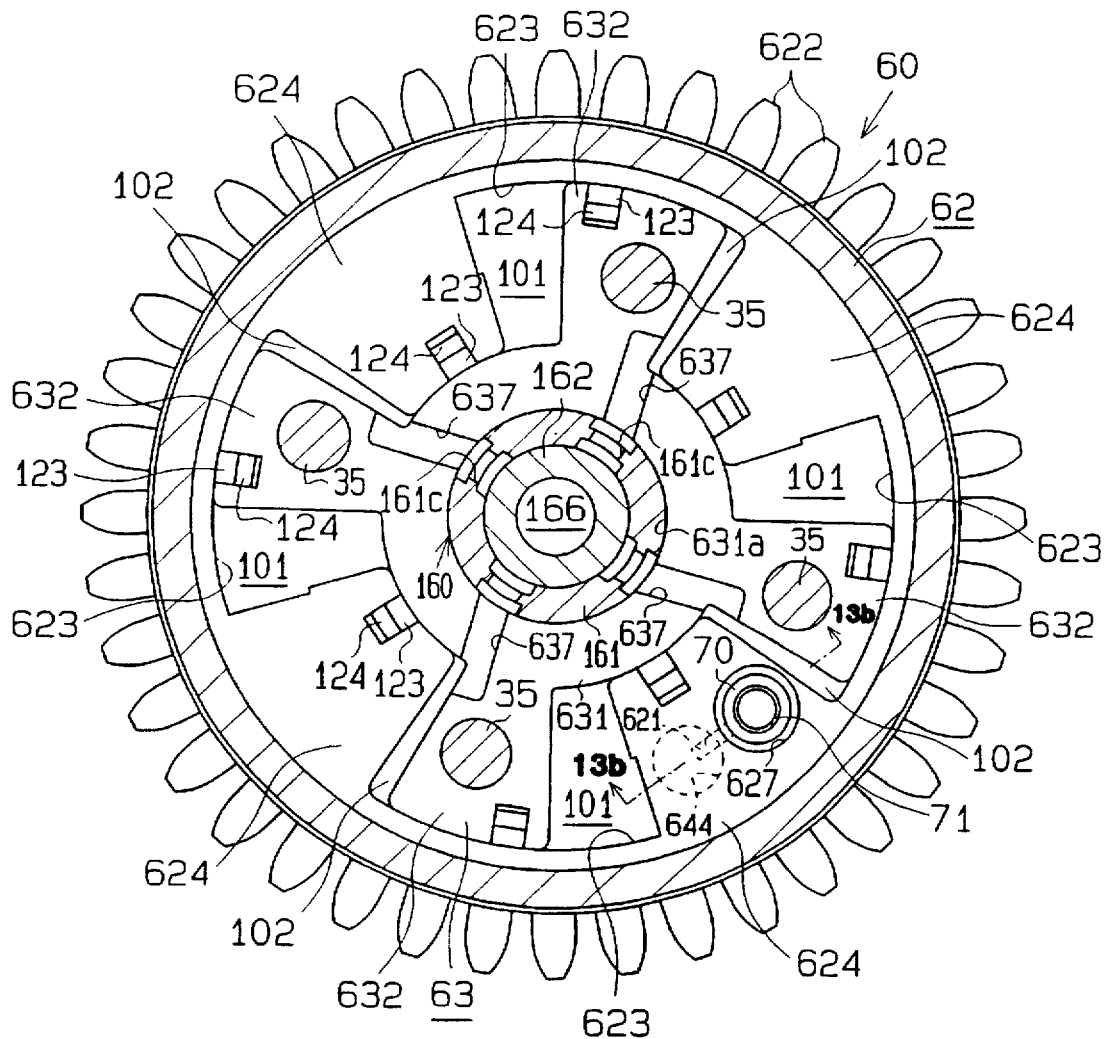
FIG. 13(a) is a cross-sectional view illustrating an operating state of the variable valve timing mechanism of FIG. 12.
Figure 13B:
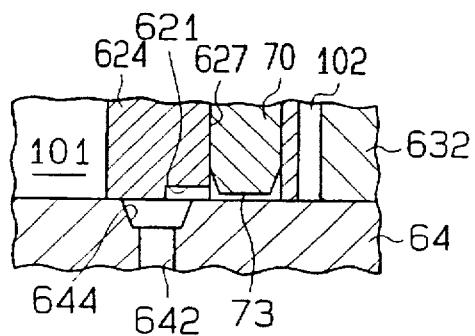
FIG. 13(b) is a partial enlarged cross-sectional view taken along line 13b—13b of FIG. 13(a)

As shown in FIGS. 13(a) and 13(b), a communicating groove 621 is formed in a surface of one of the projection 624 facing the rear plate 64. The groove 621 constantly connects the accommodating bore 627 with the lock recess 644. Therefore, even if rotation of the rotor 63 in the advanced angle direction causes the lock recess 644 to be misaligned with the lock pin 70, the communicating groove 621 allows the oil supplied to the lock recess 644 from the oil chamber 653a to be drawn into the space between the pressure receiving surface 73 of the lock pin 70 and the front face of the rear plate 64. That is, the pressure of oil in the lock recess 644 constantly acts on the pressure receiving surface 73 of the lock pin 70.

When the engine is started, that is, when the engine is being cranked, very little oil pressure is produced. Thus, the lock pin 70 is engaged with the lock recess 644 of the rear plate 64 by the force of the spring 71. This mechanically couples the front plate 61, driven gear 62, rotor 63, the rear plate 64 and the camshaft 15. Therefore, when the engine is started, the rotation phase of the camshaft 15 with respect to the driven gear 62 and the crankshaft 172 is not varied.

After the engine is started, the hydraulic pump 46 sends oil from the oil pan 47 to the oil chamber 653a via the passage 195, the annular groove 159 and the passages 654, 655. Oil in the oil chamber 653a is then supplied to the annular groove 162a via the connection passage 643, the supply groove 633 and the supply port 161a. Oil in the oil chamber 653a is also supplied to the lock recess 644 via the communicating groove 656 and the supply hole 642. The pressure of oil acts on the pressure receiving surface 73 of the lock pin 70.

As the hydraulic pump 46 increases oil pressure, the pressure acting on the pressure receiving surface 73 increases. When the force of the oil pressure acting on the surface 73 is greater than the force of the spring 71, the lock pin 70 is disengaged from the lock recess 644 and is accommodated in the bore 627. This allows smooth relative rotation between the rotor 63 and the driven gear 62.

Oil from the pump 46 is directly drawn into the lock recess 644 without an advance angle chamber 101 or a retard angle chamber 102 in between. Therefore, the oil pressure acting on the pressure receiving surface 73 is not affected by pressure fluctuation in the advance angle chambers 101 or in the retard angle chambers 102 caused by torque fluctuation of the chamber 15. Accordingly, the pressure acting on the lock pin 70 remains constant. This ensures the retention of the lock pin 70 in the bore 627.

In this state, if the spool 162 of the OCV 160 is moved rightward, the annular groove 162a connects the supply ports 161a with the advance angle ports 161b. This causes the oil in the groove 162a to be supplied to each advance angle chamber 101 via the advance angle ports 161b and the advance angle passage 636. The oil pressure in the advance angle chambers 101 increases, accordingly.

At the same time, the retard angle ports 161c are connected to the space 167. This causes oil in the retard angle chambers 102 to be discharged to the oil pan 47 via the retard angle passage 637, retarded angle ports 161c, the space 167 and the discharge hole 168. This lowers the oil pressure in the retard angle chambers 102.

Figure 12:
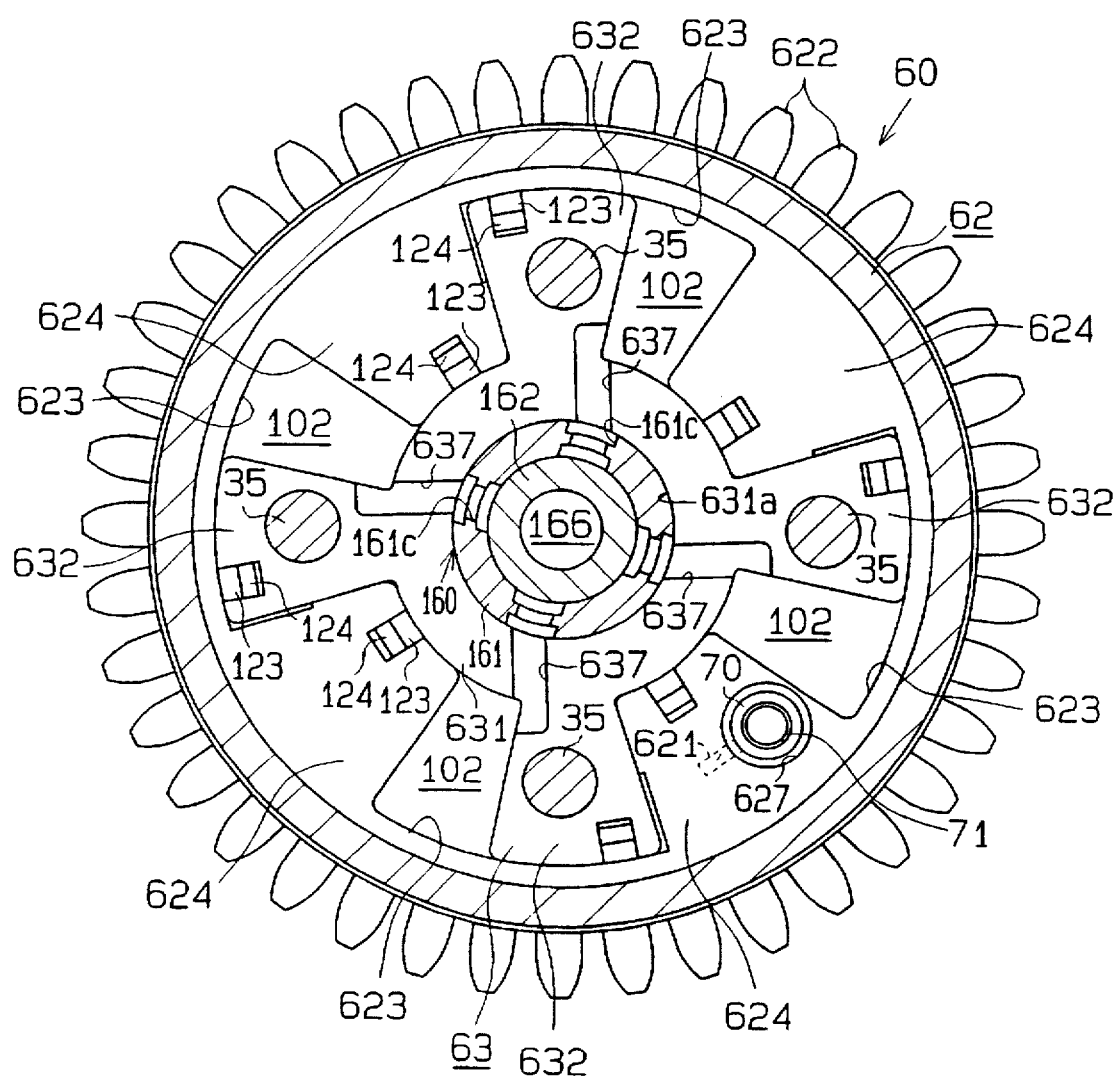
FIG. 12 is a cross-sectional view taken along line 12—12 of FIG. 11.

When the pressure in the advance angle chambers 101 increases and the pressure in the retard angle chambers 102 lowers, the rotor 63 rotates clockwise as viewed in FIG. 12 with respect to the driven gear 62. This changes the rotation phase of the intake camshaft 15 with respect to the driven gear 62, or the crankshaft 171 as shown in FIG. 13(a). That is, the camshaft 15 is rotated to an advanced angle position. This rotation of the camshaft 15 advances the times at which the intake valves 177 are opened.

Figure 11:
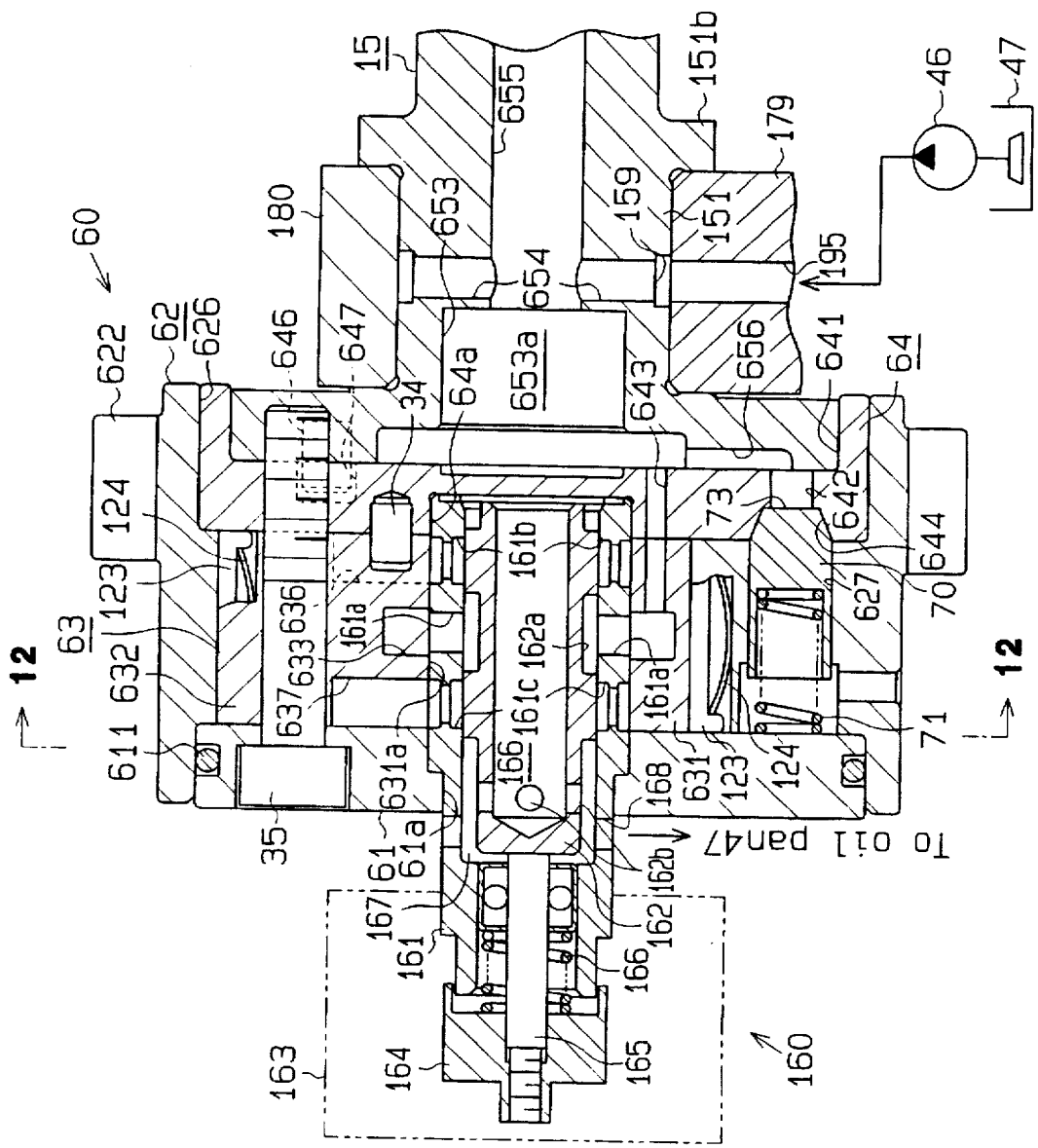
FIG. 11 is a cross-sectional side view illustrating a variable valve timing mechanism according to a third embodiment of the present invention.

On the other hand, if the spool 162 of the OCV 160 is moved leftward as viewed in FIG. 11, the annular groove 162a connects the supply ports 161a with the retarded angle ports 161c. This causes the oil in the groove 162a to be supplied to each retard angle chamber 102 via the retarded angle ports 161c and the retard angle passage 637. The oil pressure in the retard angle chambers 102 increases, accordingly.

At the same time, the advance angle ports 161b are connected to the discharge passage 166 in the spool 162. This causes oil in the advance angle chambers 101 to be discharged to the oil pan 47 via the advance angle passage 636, the advance angle ports 161b, the discharge passage 166, the bores 162b, the space 167 and the discharge hole 168. This lowers the oil pressure in the advance angle chambers 101.

When the pressure in the retard angle chambers 102 increases and the pressure in the advance angle chambers 101 lowers, the rotor 63 rotates counterclockwise as viewed in FIG. 13(a) with respect to the driven gear 62. This changes the rotation phase of the intake camshaft 15 with respect to the driven gear 62, or the crankshaft 171 as shown in FIG. 12. That is, the camshaft 15 is rotated to a retard angle position. This rotation of the camshaft 15 retards the times at which the intake valves 177 are opened.

When the valve timing is changed, the lock recess 644 is misaligned from the lock pin 70 as illustrated in FIG. 13(b). Even in this case, oil drawn into the lock recess 644 from the oil chamber 653a is supplied to the space between the pressure receiving surface 73 of the lock pin 70 and the front face of the rear plate 64 via the communicating groove 621. Therefore, the oil pressure in the lock recess 644 constantly acts on the pressure receiving surface 73 of the lock pin 70.

When the engine is stopped, oil in the advance angle chambers 101 and the retard angle chambers 102 flows into the oil pan 47. At this time, the pressure acting on the pressure receiving surface 73 is lowered, accordingly. This allows the lock pin 70 to be moved toward the rear plate 64 by the force of the spring 71. If the lock recess 644 is aligned with the lock pin 70, the lock pin 70 enters the recess 644.

As described above, in the VVT 60, as in the VVTs according to the first and second embodiments, oil pressure is constantly applied to the pressure receiving surface 73 of the lock pin 70 when the rotor 63 rotates with respect to the driven gear 62, or when the valve timing is being changed. Therefore, the third embodiment has the same advantages and effects as the first and second embodiments.

The OCV 160 is incorporated in the VVT 60. Oil from the hydraulic pump 46 is directly drawn into lock recess 644 without the OCV 160, the advance angle chambers 101 and the retard angle chambers 102 in between. Therefore, a constant oil pressure acts on the pressure receiving surface 73 of the lock pin 70 during operation of the hydraulic pump 46. The oil pressure acting on the pressure receiving surface 73 is not affected by pressure fluctuation in the advance angle chambers 101 and in the retard angle chambers 102, or the pressure fluctuation caused by the operation of the OCV 160. Accordingly, the oil pressure acting on the lock pin 70 is stabilized. This further ensures the retention of the lock pin 70 in the accommodating bore 627.

The lock pin 70 is provided with a single oil pressure receiving surface 73 to which oil pressure is applied. This simplifies the construction of the oil supply passage to the lock pin 70.

A VVT 80 according to a fourth embodiment of the present invention will now be described with reference to FIGS. 14 and 15. Like the VVTs 50 and 60 according to the second and third embodiments, the VVT 80 is suitable for the valve train shown in FIG. 7. Like or the same reference numerals are given to those components that are like or the same as the corresponding components of the third embodiment.

As in the third embodiment, oil pressure constantly acts on a pressure receiving surface 76 of a lock pin 75 in the VVT 80, regardless of the operation state of the OCV 160.

The VVT 80 includes a front plate 81, a driven gear 82, a rotor 83, a housing 84 and the intake camshaft 15.

Figure 14:
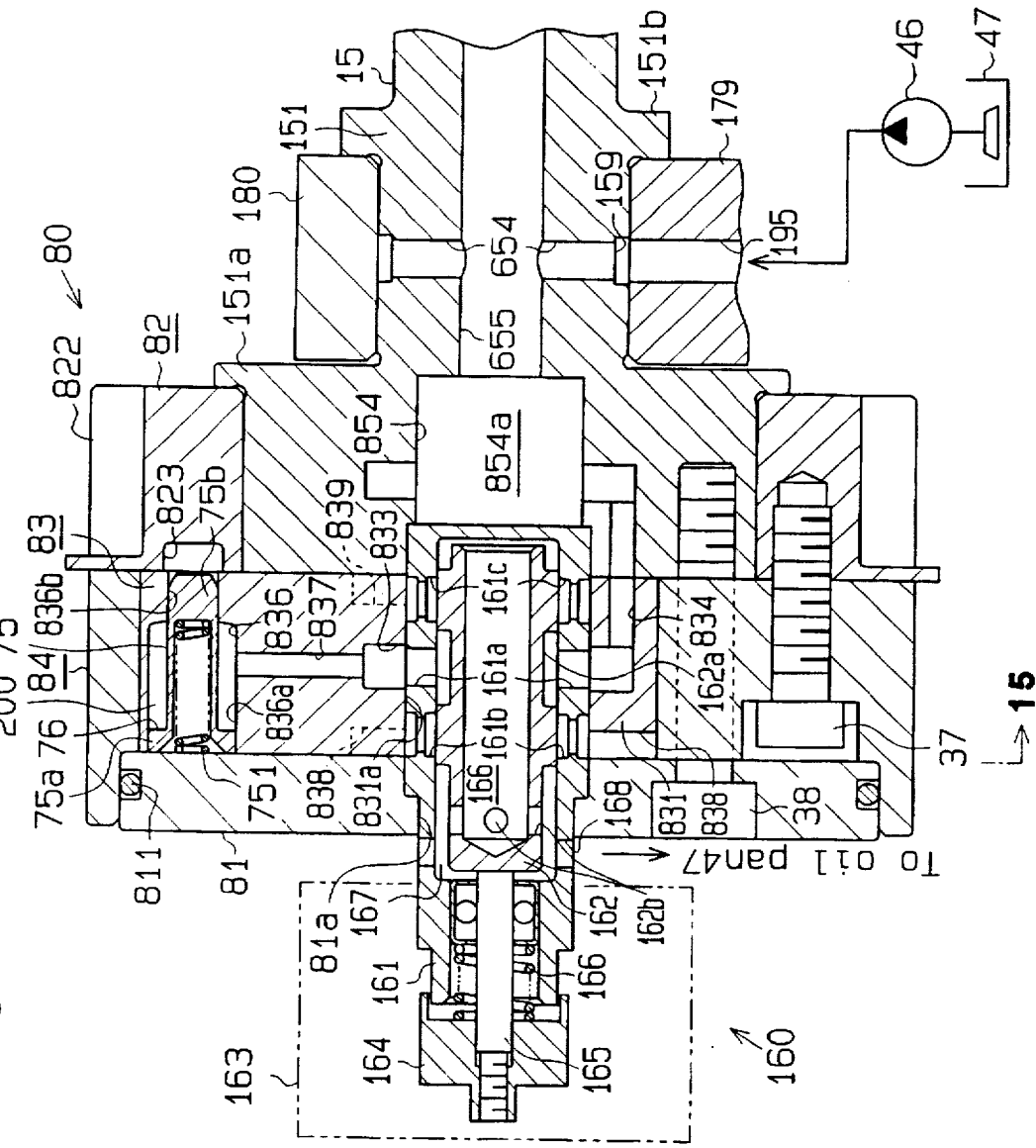
FIG. 14 is a cross-sectional side view illustrating a variable valve timing mechanism according to a fourth embodiment of the present invention.

As shown in FIG. 14, the driven gear 82 has a substantially cylindrical shape and is rotatably fitted about a flange 151a that is located at the front end of the camshaft 15. A plurality of teeth 822 are formed on the circumference of the driven gear 82. The teeth 822 are meshed with the driving gear 185 on the exhaust camshaft 171 as shown in FIG. 7.

Figure 15:
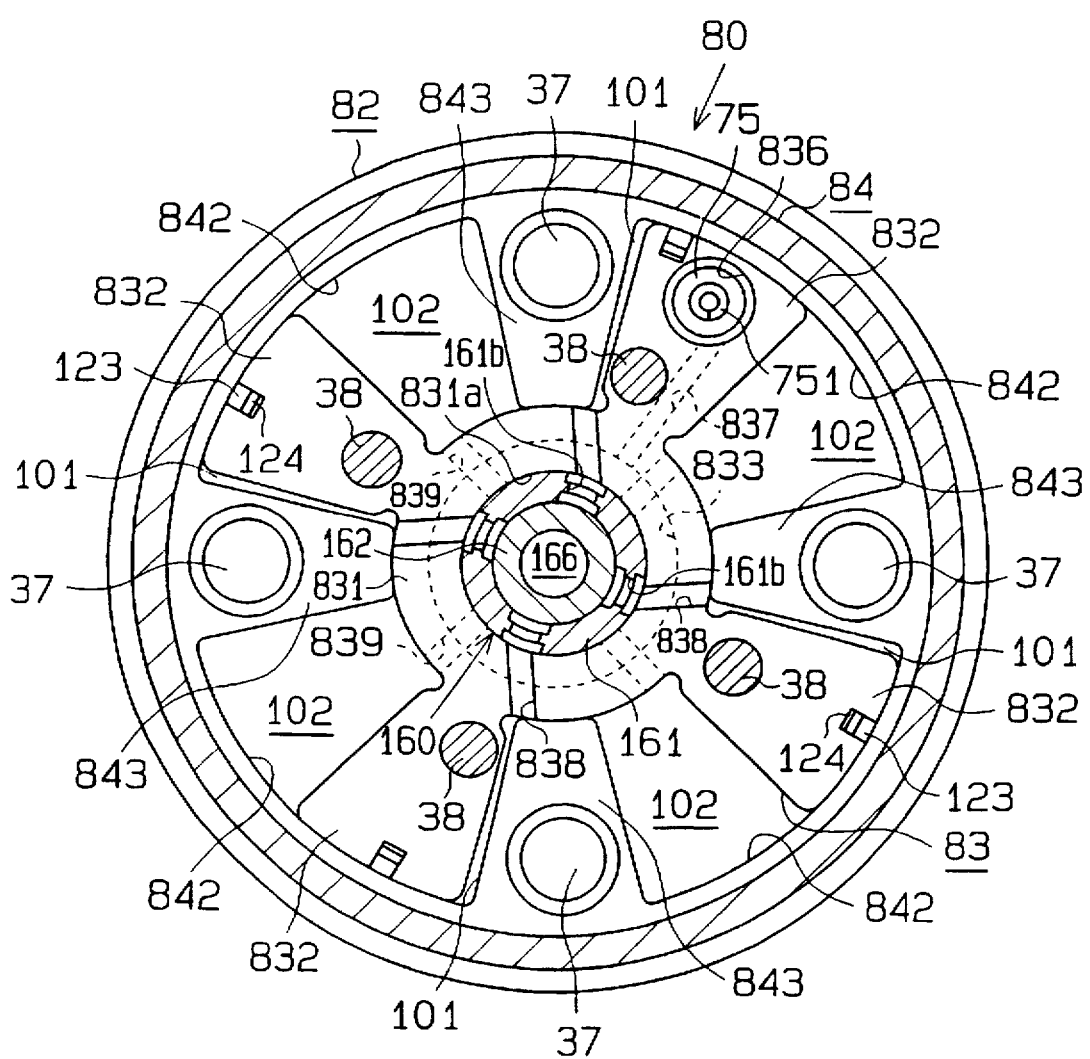
FIG. 15 is a cross-sectional view taken along line 15—15 of FIG. 14.

As shown in FIGS. 14 and 15, the housing 84 has a substantially cylindrical shape and is secured to the front face of the driven gear 82 by a plurality of bolts 37. An engaging pin (not shown) prevents relative rotation between the housing 84 and the driven gear 82. The housing 84 thus rotates integrally with the driven gear 82. The housing 84 is provided with four projections 843 that project from the inner circumference of the housing 84 toward its axis. The projections 843 are equally spaced part. Each pair of adjacent projections 843 define a vane chamber 842.

The rotor 83 includes a cylindrical portion 831. An axial bore 831a is formed in the cylindrical portion 831. The cylindrical portion 831 also has four radially projecting vanes 832. Each vane 832 is equally spaced apart from the adjacent vanes 832. The rotor 83 is coaxially secured to the flange 151a of the camshaft 15 by an engaging pin (not shown). The rotor 83 rotates integrally with the camshaft 15. The cylindrical portion 831 of the rotor 83 is accommodated in a cylindrical space defined by the projections 843 at the center part of the housing 84, while each vane 832 is accommodated in one of the vane chambers 842. Each vane 832 and the associated vane chamber 842 define an advance angle chamber 101 and a retard angle chamber 102. A seal 123 is fitted in the end of each vane 832 and pressed against the inner wall of the associated vane chamber 842 by a leaf spring 124.

The front plate 81 has a bore 81a and is coaxially fitted in the housing 52 to cover the front end of the housing 84 and the rotor 83. A plurality of bolts 38 are accommodated in bores formed in the front plate 81 and project rearward. The bolts 38 extend in vanes 832 of the rotor 83, and are screwed in the flange 151a. This secures the front plate 81 and the rotor 83 to the camshaft 15, thereby causing the front plate 81 and the rotor 83 to rotate integrally with the camshaft 15. The front inner circumference of the housing 84 is rotatably fitted about the front plate 81. A seal 811 is located between the front plate 81 and the housing 84 to seal between the plate 81 and the housing 84.

An accommodating bore 836 is formed in one of the vanes 832 of the rotor 83. A locking recess 823 is formed in the front face of the driven gear 82. The recess 823 faces the bore 836.

As in the first and second embodiments, the bore 836 has a large diameter portion 836a and a small diameter portion 836b. A lock pin 75 is slidably accommodated in the bore 836. The lock pin 75 has a large diameter portion 75a and a small diameter portion 75b. An annular pressure chamber 200 is defined between the large diameter portion 75a of the pin 75 and the small diameter portion 836b of the bore 836. The pressure in the pressure chamber 200 acts on a step defined on the lock pin 75, or a pressure receiving surface 76. The lock pin 75 is urged toward the locking recess 823 by a spring 751.

A circular recess 854 is formed in the front face of the journal 151. A step is defined in the recess 854. The large diameter portion of the recess 854 has the same diameter as the bore 831a of the rotor 83 and is aligned with the bore 831a. An OCV 160 is accommodated in the bore 81a of the front plate 81, the bore 831a of the rotor 83 and the recess 854 of the flange 151a, and is aligned with the axis of the camshaft 15. The OCV 160 has the substantially same structure as that of the third embodiment.

The VVT 80 is assembled, for example, according to the following procedure. Firstly, the driven gear 82 is mounted on the flange 151a of the journal 151. Next, the housing 84 is secured to the driven gear by the bolts 37 and the rotor 83 is mounted on the flange 151a. Then, the lock pin 75 is placed in the accommodating bore 836 and the OCV 160 is placed in the access 854 and the bore 831a. Finally, the front plate 81 is attached to the assembly by the bolt 38.

Passages for supplying oil to the advance angle chambers 101, the retard angle chambers 102 and the pressure receiving surface 76 of the lock pin 75 will now be described. The recess in the journal 151 and the rear face of the OCV 160 define an oil chamber 854a. A passage 195 is formed in the cylinder head 179 and is connected to the oil pan 47 via the hydraulic pump 46. An annular groove 159 and a plurality of passages 654, 655 are formed in the journal 151. The oil chamber 854a is connected to the passage 195 by the groove 159 and the passages 654, 655.

An annular supply groove 833 is formed in the inner circumference of the bore 831a of the rotor 83. The groove 833 communicates with the supply port 161a of the OCV 160. A connection passage 834 is formed in the rotor 83 and the journal 151 for connecting the supply groove 833 with the oil chamber 854a. A supply passage 837 is formed in the rotor 83 for connecting the supply passage 837 with the supply groove 833 of the pressure chamber 200.

A cross-shaped advance angle passage 838 is formed in the front face of the rotor 83. The advance angle passage 838 communicates each advance angle chamber 101 with one of the advance angle ports 161b of the OCV 160. A cross-shaped retard angle passage 839 is formed in the rear face of the rotor 83. The retard angle passage 839 communicates each retard angle chamber 102 with one of the retard angle ports 161c of the OCV 160.

When the engine is started, that is, when the engine is being cranked, very little oil pressure is produced. Thus, the lock pin 75 is engaged with the lock recess 823 of the driven gear 82 by the force of the spring 51. This mechanically couples the front plate 81, driven gear 82, rotor 83, the housing 84 and the camshaft 15. Therefore, when the engine is started, the rotation phase of the camshaft 15 with respect to the driven gear 82 and the crankshaft 172 is not varied.

After the engine is started, the hydraulic pump 46 sends oil from the oil pan 47 to the oil chamber 854a via the passage 195, the annular groove 159 and the passages 654, 655. Oil in the oil chamber 854a is then supplied to the annular groove 162a via the connection passage 834, the supply groove 833 and the supply port 161a. Oil in the supply groove 833 is supplied to the pressure chamber 200 via the supply passage 837. The pressure of oil acts on the pressure receiving surface 76 of the lock pin 75.

As the hydraulic pump 46 increases the oil pressure, the pressure acting on the pressure receiving surface 76 increases. When the force of the oil pressure acting on the surface 76 is greater than the force of the spring 751, the lock pin 75 is disengaged from the lock recess 823 and is accommodated in the bore 836. This allows smooth relative rotation between the rotor 83 and the driven gear 82.

Oil from the pump 46 is directly drawn into the pressure chamber 200 without an advance angle chamber 101 or a retard angle chamber 102 in between. Therefore, the oil pressure acting on the pressure receiving surface 76 is not affected by pressure fluctuation in the advance angle chambers 101 or in the retard angle chambers 102 caused by torque fluctuation of the camshaft 15. Accordingly, the pressure acting on the lock pin 75 remains constant. This ensures retention of the lock pin 75 in the bore 836.

In this state, if the spool 162 of the OCV 160 is moved leftward as viewed in FIG. 14, the annular groove 162a connects the supply ports 161a with the advance angle ports 161b. This causes the oil in the groove 162a to be supplied to each advance angle chamber 101 via the advance angle ports 161b and the advance angle passage 838. The oil pressure in the advance angle chambers 101 increases, accordingly.

At the same time, the retard angle ports 161c are connected to the discharge passage 166 in the spool 162. This causes oil in the retard angle chambers 102 to be discharged to the oil pan 47 via the retard angle passage 839, retard angle ports 161c, the discharge passage 166, the bore 162b, the space 167 and the discharge hole 168. This lowers the oil pressure in the retard angle chambers 102.

When the pressure in the advance angle chambers 101 increases and the pressure in the retard angle chambers 102 lowers, the rotor 83 rotates clockwise as viewed in FIG. 15 with respect to the housing 84. This changes the rotation phase of the intake camshaft 15 with respect to the driven gear 82, or the crankshaft 171. That is, the camshaft 15 is rotated to an advance angle position. This rotation of the camshaft 15 advances the times at which the intake valves 177 are opened.

On the other hand, if the spool 162 of the OCV 160 is moved rightward as viewed in FIG. 14, the annular groove 162a connects the supply ports 161a with the retard angle ports 161c. This causes oil in the groove 162a to be supplied to each retard angle chamber 102 via the retard angle ports 161c and the retard angle passage 839. The oil pressure in the retard angle chambers 102 increases, accordingly.

At the same time, the advance angle ports 161b are connected to the space 167. This causes oil in the advance angle chambers 101 to be discharged to the oil pan 47 via the advance angle passage 838, the advance angle ports 161b, the space 167 and the discharge hole 168. This lowers the oil pressure in the advance angle chambers 101.

When the pressure in the retard angle chambers 102 increases and the pressure in the advance angle chambers 101 lowers, the rotor 83 rotates counterclockwise as viewed in FIG. 15 with respect to the housing 84. This changes the rotation phase of the intake camshaft 15 with respect to the driven gear 82 and the crankshaft 171. That is, the camshaft 15 is rotated to a retarded angle position. This rotation of the camshaft 15 retards the times at which the intake valves 177 are opened.

When the engine and the hydraulic pump 46 are stopped, oil in the advance angle chambers 101 and the retard angle chambers 102 flows into the oil pan 47. At this time, the pressure acting on the pressure receiving surface 76 of the lock pin 75 is lowered, accordingly. This allows the lock pin 75 to be moved toward the driven gear 82 by the force of the spring 751. If the lock recess 823 is aligned with the lock pin 75, the lock pin 75 enters the recess 823.

As described above, in the VVT 80, as in the VVTs according to the first to the third embodiments, oil pressure is constantly applied to the pressure receiving surface 76 of the lock pin 75 when the rotor 83 rotates with respect to the driven gear 82, or when the valve timing is being changed. Therefore, the fourth embodiment has the same advantages and effects as the first to third embodiments.

The OCV 160 is incorporated in the VVT 80. Oil from the hydraulic pump 46 is directly drawn into the pressure chamber 200 without the OCV 160, the advance angle chambers 101 and the retard angle chambers 102 in between. Therefore, the same advantages and effects as the third embodiment are obtained. The lock pin 75 is provided with a single oil pressure receiving surface 76 to which oil pressure is applied. This simplifies the construction of oil supply passage to the lock pin 75.

Figure 16:
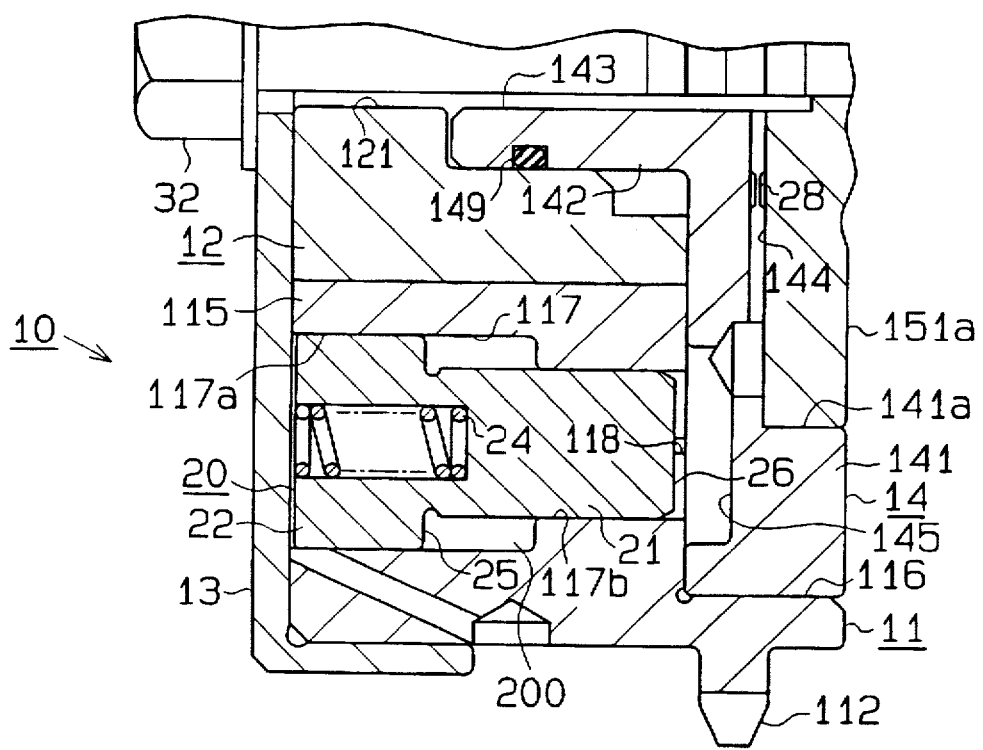
FIG. 16 is an enlarged partial cross-sectional side view illustrating a variable valve timing mechanism according to a fifth embodiment of the present invention.
Figure 17:
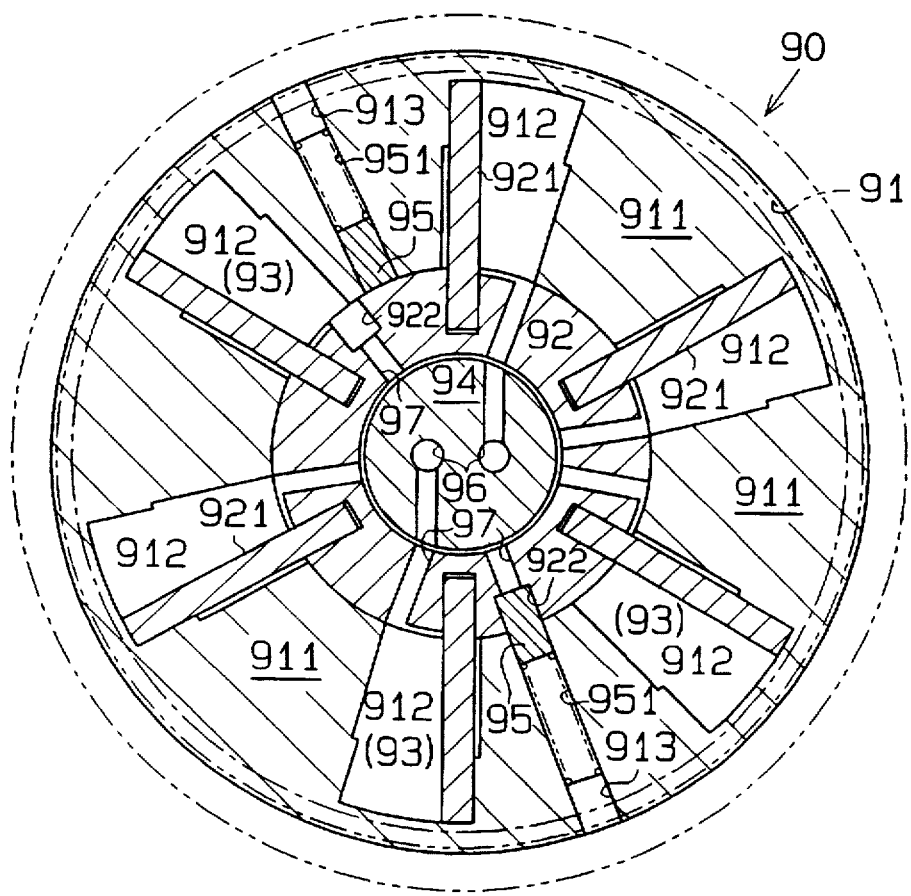
FIG. 17 is a cross-sectional front view illustrating a prior art variable valve timing mechanism.

Although four embodiments of the present invention have been described, it should be apparent to those skilled in the art that the present invention may be embodied in many other specific forms without departing from the spirit or scope of the invention. Particularly, the invention may be embodied in the following form:

In the first embodiment, a restriction 28 may be formed in the radial passage 144 that sends oil to the lock recess 145 as shown in FIG. 16. The restriction 28 reduces pressure fluctuation of oil introduced to the lock recess 145 from the space 143 via the radial passage 144. This construction further stabilizes the oil pressure acting on the second pressure receiving surface 26 of the lock pin 20. The restriction 28 may be formed in the radial passage 516 of the second embodiment illustrated in FIG. 8.

In the second to fourth embodiments, the intake camshaft having the VVT 50, 60, 80 is driven by the crankshaft 172 through the exhaust camshaft 171. In this case, the rotation phase of the intake camshaft 15 is varied with respect to the crankshaft 172. Contrarily, the exhaust camshaft 171 may be driven by the crankshaft 172 through the intake camshaft 15 having the VVT 50, 60, 80. In this case, the rotation phase of the exhaust camshaft 171 is varied with respect to the crankshaft 172.

A VVT may be provided on the exhaust camshaft 171 for varying the valve timing of the exhaust valves.

Therefore, the present example and embodiment are to be considered as illustrative and not restrictive and the invention is not to be limited to the details given herein but may modified within the scope and equivalents of the appended claims.

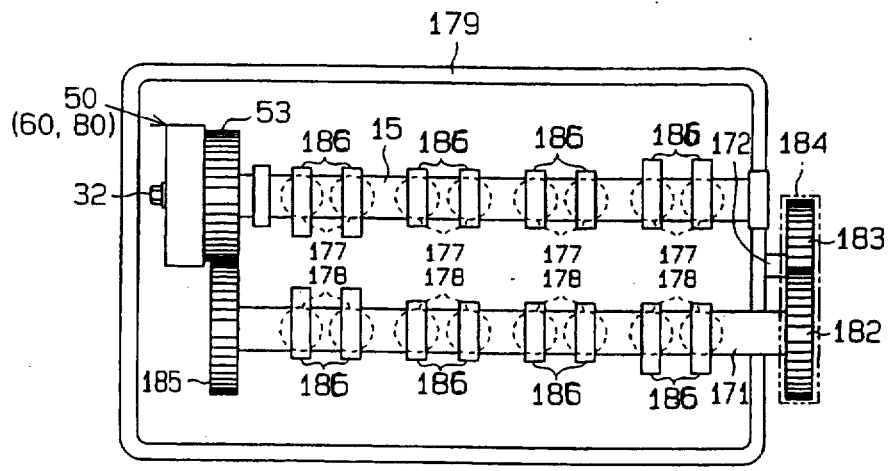

What is claimed is:

1. A variable valve timing mechanism for an internal combustion engine, the engine having a drive shaft, a driven shaft driven by the drive shaft, and at least one valve driven by the driven shaft, the mechanism varying the rotational phase of the driven shaft with respect to the drive shaft to vary the timing of the valve, the mechanism including a first rotary member for a rotation in synchronism with the drive shaft and a second rotary member for a rotation in synchronism with the driven shaft, wherein the position of the second rotary member with respect to the first rotary member varies to change the rotational phase of the driven shaft with respect to the drive shaft, the mechanism comprising:

an actuating member movable in a first direction and a second direction opposite to the first direction, the actuating member moving in the first direction to advance the valve timing, the actuating member moving in the second direction to retard the valve timing, wherein the movement of the actuating member rotates the second rotary member with respect to the first rotary member to change the rotational phase of the driven shaft with respect to the drive shaft;

the actuating member having a first side and a second side opposite to the first side;

a first hydraulic chamber located on the first side of the actuating member;

a second hydraulic chamber located on the second side of the actuating member;

means for supplying hydraulic pressure to one of the first hydraulic chamber and the second hydraulic chamber to move the actuating member in one of the first direction and the second direction, the supplying means being selectively activated and deactivated based on an operation state of the engine;

a lock member for locking the second rotary member to the first rotary member in a predetermined position to fix the rotational phase of the driven shaft with respect to the drive shaft, wherein the lock member is movable between a first position and a second position, wherein the lock member immovably holds the actuating member with respect to the hydraulic chambers to lock the second rotary member with respect to the first rotary member in the first position, and wherein the lock member releases the actuating member to unlock the second rotary member with respect to the first rotary member in the second position; and the lock member being held in the first position when the engine is out of operation, the lock member being moved to the second position based on the hydraulic pressure supplied by the supplying means upon the operation of the engine, wherein the hydraulic pressure maintains the lock member in the second position.

2. The variable valve timing mechanism according to claim 1 further comprising:

means for urging the lock member toward the first position; and means for applying the hydraulic pressure to the lock member to move the lock member toward the second position against a force of the urging means.

3. The variable valve timing mechanism according to claim 2, wherein the applying means applies the hydraulic pressure without passing the hydraulic chambers to the lock member.

4. The variable valve timing mechanism according to claim 3 further comprising:

the supplying means including:

a pump for feeding the hydraulic pressure to the first hydraulic chamber and the second hydraulic chamber;

a control valve integrally provided with the variable valve timing mechanism; and a connecting passage for connecting the pump with the control valve, wherein the control valve connects the connecting passage with one of the first hydraulic chamber and the second hydraulic chamber;

the lock member having a single pressure receiving surface; and the applying means including an introducing passage branched from the connecting passage to apply the hydraulic pressure within the connecting passage to the pressure receiving surface.

5. The variable valve timing mechanism according to claim 4 further comprising:

one of the first rotary member and the second rotary member having an engagement recess, the other one of the first rotary member and the second rotary member having a supporting hole for movably supporting the lock member, wherein the lock member is engaged with the engagement recess in the first position and is disengaged from the engagement recess in the second position;

the lock member having an end surface engageable with the engagement recess, the end surface serving as the pressure receiving surface; and the introducing passage communicating with the engagement recess to apply the hydraulic pressure to the pressure receiving surface, the hydraulic pressure being introduced into the engagement recess from the connecting passage through the introducing passage.

6. The variable valve timing mechanism according to claim 4 further comprising:

one of the first rotary member and the second rotary member having an engagement recess, the other one of the first rotary member and the second rotary member having a supporting hole for movably supporting the lock member, wherein the lock member is engaged with the engagement recess in the first position and is disengaged from the engagement recess in the second position;

the lock member having a large diameter section and a small diameter section, wherein the pressure receiving surface is provided between the large diameter section and the small diameter section;

the supporting hole having a large diameter portion and a small diameter portion, the large diameter portion having a length greater than that of the large diameter section, the small diameter portion having a length smaller than that of the small diameter section, whereby a space is defined between the supporting hole and the lock member to receive the hydraulic pressure; and the introducing passage communicating with the space to apply the hydraulic pressure to the pressure receiving surface, the hydraulic pressure being introduced into the space from the connecting passage through the introducing passage.

7. The variable valve timing mechanism according to claim 2, wherein the supplying means includes:
   a pump for feeding the hydraulic pressure to the first hydraulic chamber and the second hydraulic chamber;
   a control valve connected with the pump;
   a first supplying passage for connecting the control valve with the first hydraulic chamber;
   a second supplying passage for connecting the control valve with the second hydraulic chamber; and
   the control valve connecting the pump with one of the first supplying passage and the second supplying passage.

8. The variable valve timing mechanism according to claim 7, wherein the lock member has a first pressure receiving surface and a second pressure receiving surface, wherein the applying means applies the hydraulic pressure to one of the first pressure receiving surface and the second pressure receiving surface.

9. The variable valve timing mechanism according to claim 8, wherein the applying means includes:
   a first introducing passage for introducing the hydraulic pressure that is supplied to the first hydraulic chamber to one of the first pressure receiving surface and the second pressure receiving surface; and
   a second introducing passage for introducing the hydraulic pressure that is supplied to the second hydraulic chamber to one of the first pressure receiving surface and the second pressure receiving surface.

10. The variable valve timing mechanism according to claim 9, wherein the supplying means supplies the hydraulic pressure to the first hydraulic chamber to move the actuating member in the first direction and supplies the hydraulic pressure to the second hydraulic chamber to move the actuating member in the second direction, wherein the hydraulic pressure supplied to the first hydraulic chamber is greater than the hydraulic pressure supplied to the second hydraulic chamber.

11. The variable valve timing mechanism according to claim 10, wherein the area of the first pressure receiving surface and the area of the second pressure receiving surface are determined substantially equalize the force for biasing the lock member based on the hydraulic pressure applied to the first pressure receiving surface and the force for biasing the lock member based on the hydraulic pressure applied to the second pressure receiving surface.

12. The variable valve timing mechanism according to claim 9 further comprising a restriction formed in at least one of the first introducing passage and the second introducing passage.

13. The variable valve timing mechanism according to claim 9, wherein the first introducing passage includes a communicating passage communicating with the first hydraulic chamber to apply the hydraulic pressure within the first hydraulic chamber to one of the first pressure receiving surface and the second pressure receiving surface.

14. The variable valve timing mechanism according to claim 9, wherein the first introducing passage includes a branch passage branched from the first supplying passage to apply the hydraulic pressure within the first supplying passage to one of the first pressure receiving surface and the second pressure receiving surface.

15. The variable valve timing mechanism according to claim 9, wherein the second introducing passage includes a communicating passage communicating with the second hydraulic chamber to apply the hydraulic pressure within the second hydraulic chamber to one of the first pressure receiving surface and the second pressure receiving surface.

16. The variable valve timing mechanism according to claim 9, wherein the second introducing passage includes a branch passage branched from the second supplying passage to apply the hydraulic pressure within the second supplying passage to one of the first pressure receiving surface and the second pressure receiving surface.

17. The variable valve timing mechanism according to claim 9 further comprising:
   one of the first rotary member and the second rotary member having an engagement recess, the other one of the first rotary member and the second rotary member having a supporting hole for movably supporting the lock member, wherein the lock member is engaged with the engagement recess in the first position and is disengaged from the engagement recess in the second position;
   the lock member having a large diameter section and a small diameter section, wherein the first pressure receiving surface is provided between the large diameter section and the small diameter section, wherein the small diameter section has an end surface engageable with the engagement recess, the end surface serving as the second pressure receiving surface; and
   the supporting hole having a large diameter portion and a small diameter portion, the large diameter portion having a length greater than that of the large diameter section, the small diameter portion having a length smaller than that of the small diameter section, whereby a space is defined between the supporting hole and the lock member to receive the hydraulic pressure.

18. The variable valve timing mechanism according to claim 17, wherein one of the first introducing passage and the second introducing passage communicates with the engagement recess to apply the hydraulic pressure introduced into the engagement recess to the second pressure receiving surface, wherein the other one of the first introducing passage and the second introducing passage communicates with the space to apply the hydraulic pressure introduced into the space to the first pressure receiving surface.

19. The variable valve timing mechanism according to claim 2, wherein the first rotary member has at least one recess therein, wherein the second rotary member is located within the first rotary member, wherein the actuating member includes a vane provided with the second rotary member, the vane being movable in the recess and dividing the recess into the first hydraulic chamber and the second hydraulic chamber.

20. A variable valve timing mechanism for an internal combustion engine, the engine having a drive shaft, a driven shaft driven by the drive shaft, and at least one valve driven by the driven shaft, the mechanism varying the rotational phase of the driven shaft with respect to the drive shaft to vary the timing of the valve, the mechanism comprising:
   a first rotary member for a rotation in synchronism with the drive shaft, the first rotary member having at least one recess therein;
   a second rotary member for a rotation in synchronism with the driven shaft, the second rotary member being located within the first rotary member, and the second rotary member having a vane movable in the recess to divide the recess into a first hydraulic chamber and a second hydraulic chamber, wherein the vane is movable in a first direction and a second direction opposite to the first direction, the vane moving in the first direction to advance the valve timing and moving in the second direction to retard the valve timing, wherein the movement of the vane rotates the second rotary member with respect to the first rotary member to change the rotational phase of the driven shaft with respect to the drive shaft;

means for supplying hydraulic pressure to one of the first hydraulic chamber and the second hydraulic chamber to move the vane in one of the first direction and the second direction, the supplying means being selectively activated and deactivated based on an operational state of the engine;

a lock member for locking the second rotary member to the first rotary member in a predetermined position to fix the rotational phase of the driven shaft with respect to the drive shaft, wherein the lock member is movable between a first position and a second position, wherein the lock member immovably holds the vane with respect to the hydraulic chambers to lock the second rotary member with respect to the first rotary member in the first position, and wherein the lock member releases the vane to unlock the second rotary member with respect to the first rotary member in the second position;

one of the first rotary member and the second rotary member having an engagement recess, the other one of the first rotary member and the second rotary member having a supporting hole for movably supporting the lock member, wherein the lock member is engaged with the engagement recess in the first position and is disengaged from the engagement recess in the second position;

means for urging the lock member toward the first position to hold the lock member in the first position when the engine is out of operation; and means for applying the hydraulic pressure to the lock member to move the lock member toward the second position against force of the urging means, wherein the hydraulic pressure is supplied by the supplying means upon the operation of the engine and maintains the lock member in the second position.

21. The variable valve timing mechanism according to claim 20, wherein the applying means applies the hydraulic pressure without passing the hydraulic chambers to the lock member.

22. The variable valve timing mechanism according to claim 21 further comprising:

the supplying means including:
 a pump for feeding the hydraulic pressure to the first hydraulic chamber and the second hydraulic chamber;
 a control valve integrally provided with the variable valve timing mechanism; and
 a connecting passage for connecting the pump with the control valve, wherein the control valve connects the connecting passage with one of the first hydraulic chamber and the second hydraulic chamber;

the lock member having a single pressure receiving surface; and the applying means including an introducing passage branched from the connection passage to apply the hydraulic pressure within the connecting passage to the pressure receiving surface.

23. The variable valve timing mechanism according to claim 22 further comprising:

the lock member having an end surface engageable with the engagement recess, the end surface serving as the pressure receiving surface; and the introducing passage communicating with the engagement recess to apply the hydraulic pressure to the pressure receiving surface, the hydraulic pressure being introduced into the engagement recess from the connecting passage through the introducing passage.

24. The variable valve timing mechanism according to claim 22 further comprising:

the lock member having a large diameter section and a small diameter section, wherein the pressure receiving surface is provided between the large diameter section and the small diameter section;

the supporting hole having a large diameter portion and a small diameter portion, the large diameter portion having a length greater than that of the large diameter section, the small diameter portion having a length smaller than that of the small diameter section, whereby a space is defined between the supporting hole and the lock member to receive the hydraulic pressure; and the introducing passage communicating with the space to apply the hydraulic pressure to the pressure receiving surface, the hydraulic pressure being introduced into the space from the connecting passage through the introducing passage.

25. The variable valve timing mechanism according to claim 20, wherein the supplying means includes:

a pump for feeding the hydraulic pressure to the first hydraulic chamber and the second hydraulic chamber;

a control valve connected with the pump;

a first supplying passage for connecting the control valve with the first hydraulic chamber;

a second supplying passage for connecting the control valve with the second hydraulic chamber; and the control valve connecting the pump with one of the first supplying passage and the second supplying passage.

26. The variable valve timing mechanism according to claim 25, wherein the lock member has a first pressure receiving surface and a second pressure receiving surface, wherein the applying means applies the hydraulic pressure to one of the first pressure receiving surface and the second pressure receiving surface, and wherein the applying means includes:

a first introducing passage for introducing the hydraulic pressure that is supplied to the first hydraulic chamber to one of the first pressure receiving surface and the second pressure receiving surface; and a second introducing passage for introducing the hydraulic pressure that is supplied to the second hydraulic chamber to the other one of the first pressure receiving surface and the second pressure receiving surface.

27. The variable valve timing mechanism according to claim 26, wherein the supplying means supplies the hydraulic pressure to the first hydraulic chamber to move the actuating member in the first direction and supplies the hydraulic pressure to the second hydraulic chamber to move the actuating member in the second direction, wherein the hydraulic pressure supplied to the first hydraulic chamber is greater than the hydraulic pressure supplied to the second hydraulic chamber, and wherein the area of the first pressure receiving surface and the area of the second pressure receiving surface are determined substantially equalize the force for biasing the lock member based on the hydraulic pressure applied to the first pressure receiving surface and the force for biasing the lock member based on the hydraulic pressure applied to the second pressure receiving surface.

28. The variable valve timing mechanism according to claim 26 further comprising a restriction formed in at least one of the first introducing passage and the second introducing passage.

29. The variable valve timing mechanism according to claim 26, wherein the first introducing passage includes a branch passage branched from the first supplying passage to apply the hydraulic pressure within the first supplying passage to one of the first pressure receiving surface and the second pressure receiving surface.

30. The variable valve timing mechanism according to claim 26, wherein the second introducing passage includes a branch passage branched from the second supplying passage to apply the hydraulic pressure within the second supplying passage to one of the first pressure receiving surface and the second pressure receiving surface.

31. The variable valve timing mechanism according to claim 26 further comprising:

the lock member having a large diameter section and a small diameter section, wherein the first pressure receiving surface is provided between the large diameter section and the small diameter section, wherein the small diameter section has an end surface engageable with the engagement recess, the end surface serving as the second pressure receiving surface;

the supporting hole having a large diameter portion and a small diameter portion, the large diameter portion having a length greater than that of the large diameter section, the small diameter portion having a length smaller than that of the small diameter section, whereby a space is defined between the supporting hole and the lock member to receive the hydraulic pressure; and one of the first introducing passage and the second introducing passage communicating with the engagement recess to apply the hydraulic pressure introduced into the engagement recess to the second pressure receiving surface, the other one of the first introducing passage and the second introducing passage communicating with the space to apply the hydraulic pressure introduced into the space to the first pressure receiving surface.

* * * * *

UNITED STATES PATENT AND TRADEMARK OFFICE
CERTIFICATE OF CORRECTION

PATENT NO.   : 5,797,361
DATED        : August 25, 1998
INVENTOR(S)  : Kazuhisa Mikame, et al.

Page 1 of 5

It is certified that error appears in the above-identified patent and that said Letters Patent is hereby corrected as shown below:

| Column | Line | |
|---|---|---|
| 1 | 38 | Delete "in the inner" (second occurrence). |
| 1 | 63 | Change "hole 92" to --hole 922--. |
| 2 | 6 | Change "is therefore disengaged the pin 95" to --the pin 95 is therefore disengaged--. |
| 2 | 26 | After "against" delete "to". |
| 3 | 9 | Change "actuation" to --actuating--. |
| 3 | 16 | Change "Sup-" to --A sup--. |
| 3 | 53 | After "cross-sectional" insert --of--. |
| 6 | 54 | Change "pump 26" to --pump 46--. |

UNITED STATES PATENT AND TRADEMARK OFFICE
CERTIFICATE OF CORRECTION

PATENT NO.   : 5,797,361
DATED        : August 25, 1998
INVENTOR(S)  : Kazuhisa Mikame, et al.

It is certified that error appears in the above-identified patent and that said Letters Patent is hereby corrected as shown below:

| Column | Line | |
|---|---|---|
| 8  | 25 | After "such" insert --that--. |
| 8  | 32 | After "pressure" delete "of". |
| 8  | 33 | After "pressure" delete "of". |
| 9  | 21 | After "upstream" insert --from--. |
| 9  | 67 | After "reservoir" change "port" to --ports--. |
| 11 | 45 | Change "camshaft" to --camshafts--. |
| 12 | 7  | Change "chamber" to --chambers--. |
| 12 | 36 | Change "bore 522" to --bore 511--. |
| 13 | 54 | Change "passage" to --passages--. |

UNITED STATES PATENT AND TRADEMARK OFFICE
CERTIFICATE OF CORRECTION

PATENT NO. : 5,797,361
DATED : August 25, 1998
INVENTOR(S) : Kazuhisa Mikame, et al.

It is certified that error appears in the above-identified patent and that said Letters Patent is hereby corrected as shown below:

| Column | Line | |
|---|---|---|
| 14 | 10 | After "that" delete "of". |
| 14 | 16 | After "decreased" change "at" to --as--. |
| 14 | 40 | After "reservoir" change "port" to --ports--. |
| 15 | 24 | Change "As" to --A--. |
| 16 | 21 | After "advance" insert --angle--. |
| 16 | 26 | Before "fitted" insert --is--. |
| 16 | 34 | After "toward" delete "with". |
| 17 | 6 | Change "groove 63" to --groove 633--. |
| 17 | 31 | Change "projection" to --protections--. |
| 18 | 7 | Change "chamber 15" to --camshaft 15--. |

UNITED STATES PATENT AND TRADEMARK OFFICE
CERTIFICATE OF CORRECTION

PATENT NO.   : 5,797,361
DATED        : August 25, 1998
INVENTOR(S)  : Kazuhisa Mikame, et al.

It is certified that error appears in the above-identified patent and that said Letters Patent is hereby corrected as shown below:

| Column | Line | |
|--------|------|---|
| 20 | 48 | Change "access" to --recess--. |
| 22 | 59 | Change "camshaft" to --camshaft 15--. |
| 23 | 5  | After "may" insert --be--. |
| 25 | 29 | Before "one" insert --the other--. |
| 25 | 43 | After "determined" insert --to--. |
| 27 | 63 | Change "connection" to --connecting--. |

Signed and Sealed this

Eighth Day of May, 2001

Attest:

NICHOLAS P. GODICI

Attesting Officer

Acting Director of the United States Patent and Trademark Office

UNITED STATES PATENT AND TRADEMARK OFFICE
CERTIFICATE OF CORRECTION

PATENT NO. : 5,797,361
DATED : August 25, 1998
INVENTOR(S) : Kazuhisa Mikame, et al.

Page 5 of 5

It is certified that error appears in the above-identified patent and that said Letters Patent is hereby corrected as shown below:

Column     Line

Fig. 7     Should be corrected as follows (substituting --186-- for "185" in eight places):